(12) United States Patent
Shimizu et al.

(10) Patent No.: US 11,264,924 B2
(45) Date of Patent: Mar. 1, 2022

(54) MOTOR DRIVING APPARATUS AND REFRIGERATION CYCLE EQUIPMENT

(71) Applicant: Mitsubishi Electric Corporation, Tokyo (JP)

(72) Inventors: Yuichi Shimizu, Tokyo (JP); Kazunori Hatakeyama, Tokyo (JP); Keisuke Uemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/976,920

(22) PCT Filed: Mar. 30, 2018

(86) PCT No.: PCT/JP2018/013790
§ 371 (c)(1),
(2) Date: Aug. 31, 2020

(87) PCT Pub. No.: WO2019/187059
PCT Pub. Date: Oct. 3, 2019

(65) Prior Publication Data
US 2021/0044223 A1  Feb. 11, 2021

(51) Int. Cl.
*H02P 3/22* (2006.01)
*H02P 21/18* (2016.01)
(Continued)

(52) U.S. Cl.
CPC ............. *H02P 3/22* (2013.01); *F25B 49/025* (2013.01); *H02H 7/0844* (2013.01);
(Continued)

(58) Field of Classification Search
CPC .. H02P 21/01; H02P 27/08; H02P 6/24; H02P 45/17; F25B 49/025; H02H 7/0844
See application file for complete search history.

(56) References Cited

U.S. PATENT DOCUMENTS 10,177,691 B2 *  1/2019  Eshleman ........... H02P 29/0241
2003/0102839 A1  6/2003  Kinpara et al.
(Continued)

FOREIGN PATENT DOCUMENTS

GB      1463770 A      2/1977
JP     S49-128215 A   12/1974
(Continued)

OTHER PUBLICATIONS

International Search Report of the International Searching Authority dated Jul. 3, 2018 for the corresponding International application No. PCT/JP2018/013790 (and English translation).
(Continued)

*Primary Examiner* — Said Bouziane
(74) *Attorney, Agent, or Firm* — Posz Law Group, PLC

(57) ABSTRACT

In a motor driving apparatus including an inverter connectable to n motors (n being an integer not less than 2) each including a rotor having a permanent magnet, braking operation is performed on i (i being an integer from 1 to n−1) of the n motors, and then braking operation is performed on j (j being an integer from 1 to n−i) of the n motors other than the i motors. It is possible to reduce the risks of failure of the inverter and demagnetization of the motors due to overcurrent by reducing current flowing through the inverter and the motors when the braking operation is performed.

16 Claims, 21 Drawing Sheets

(51) Int. Cl.
    *H02P 21/22*     (2016.01)
    *F25B 49/02*     (2006.01)
    *H02H 7/08*     (2006.01)
    *H02H 7/122*     (2006.01)
    *H02P 6/24*     (2006.01)
    *H02P 27/08*     (2006.01)

(52) U.S. Cl.
    CPC ............ *H02H 7/1225* (2013.01); *H02P 6/24* (2013.01); *H02P 21/18* (2016.02); *H02P 21/22* (2016.02); *H02P 27/08* (2013.01); *F25B 2600/021* (2013.01)

(56) References Cited

U.S. PATENT DOCUMENTS

2008/0079373 A1*   4/2008   Melfi .................. H02P 5/74
                                                         318/63

2009/0251083 A1   10/2009   Kinpara et al.
2013/0307446 A1   11/2013   Ichikawa

FOREIGN PATENT DOCUMENTS

| JP | H06-315201 A | 11/1994 |
|---|---|---|
| JP | 2005-022321 A | 1/2005 |
| JP | 2011-072062 A | 4/2011 |
| JP | 4672236 B2 | 4/2011 |
| JP | 5173209 B2 | 1/2013 |
| JP | 2016-077076 A | 5/2016 |
| JP | 5981219 B2 | 8/2016 |
| WO | 02/091558 A1 | 11/2002 |
| WO | 2008/001445 A1 | 1/2008 |

OTHER PUBLICATIONS

Office Action dated Jul. 27, 2021, issued in corresponding JP Patent Application No. 2020-508832 (and English Machine Translation).

* cited by examiner

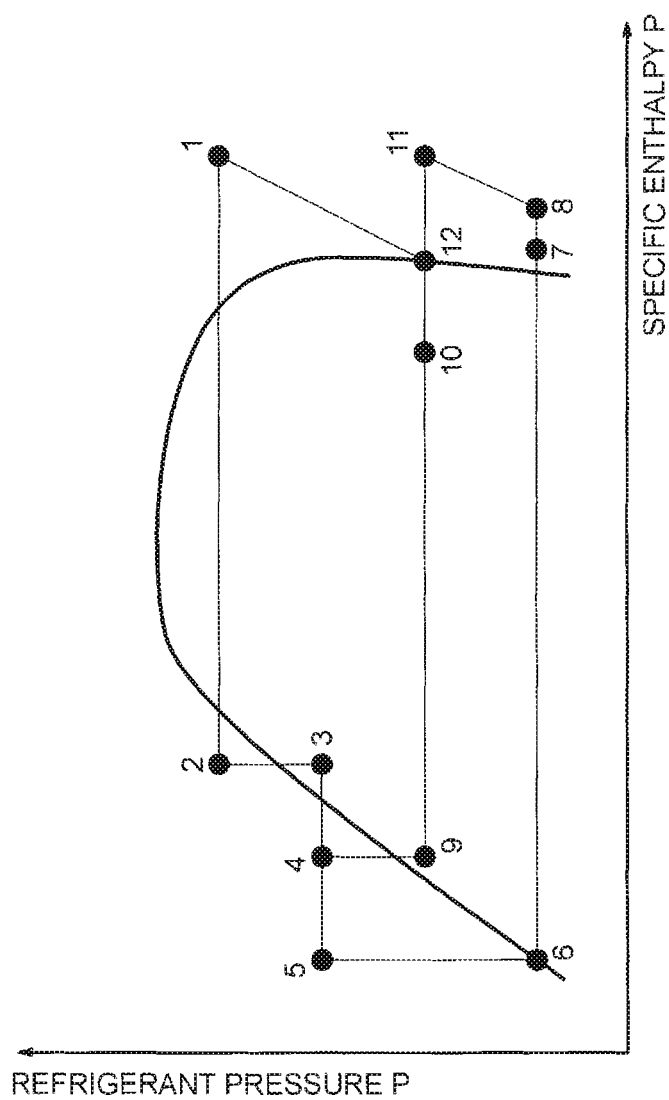

MOTOR DRIVING APPARATUS AND REFRIGERATION CYCLE EQUIPMENT

CROSS REFERENCE TO RELATED APPLICATION

This application is a U.S. national stage application of International Patent Application No. PCT/JP2018/013790 filed on Mar. 30, 2018, the disclosure of which is incorporated herein by reference.

TECHNICAL FIELD

The present invention relates to a motor driving apparatus and refrigeration cycle equipment provided therewith.

BACKGROUND

There is a conventional technique that, in a motor driving apparatus for driving multiple motors with a single inverter, when the motors are free running, performs braking operation to stop the motors by forming a current path between the inverter and the motors to allow regenerative current to flow therethrough (see, e.g., Patent Literature 1).

PATENT LITERATURE

Patent Literature 1: Japanese Patent No. 5173209

In the technique described in Patent Literature 1, when braking operation is performed on the multiple motors, a larger current flows through the inverter and the motors than when braking operation is performed on one of the motors. For example, when two motors are equal in rotational speed and phase during braking operation, current flows about twice as much as when braking operation is performed on one of the motors. This may cause failure of the inverter or demagnetization of the motors due to overcurrent.

SUMMARY

The present invention has been made in view of the above, and is intended to, in a motor driving apparatus capable of driving multiple motors with a single inverter, reduce current flowing through the inverter and the motors, reducing the risks of failure of the inverter and demagnetization of the motors due to overcurrent.

To solve the above problems, a motor driving apparatus according to the present invention includes an inverter connectable to n motors each including a rotor having a permanent magnet, n being an integer not less than 2, wherein the motor driving apparatus performs braking operation on i of the n motors and then performs braking operation on j of the n motors other than the i motors, i being an integer from 1 to n−1, j being an integer from 1 to n−i.

With the present invention, it is possible to reduce current flowing through the inverter and the motors when braking operation is performed on the motors, thereby reducing the risks of failure of the inverter and demagnetization of the motors due to overcurrent.

BRIEF DESCRIPTION OF DRAWINGS

FIG. 21 is a Mollier chart illustrating the state of a refrigerant in the heat pump apparatus illustrated in FIG. 20.

DETAILED DESCRIPTION

The following describes motor driving apparatuses according to embodiments of the present invention, and refrigeration cycle equipment provided therewith, with reference to the attached drawings. The following embodiments do not impose limitations on the present invention.

First Embodiment

Figure 1:
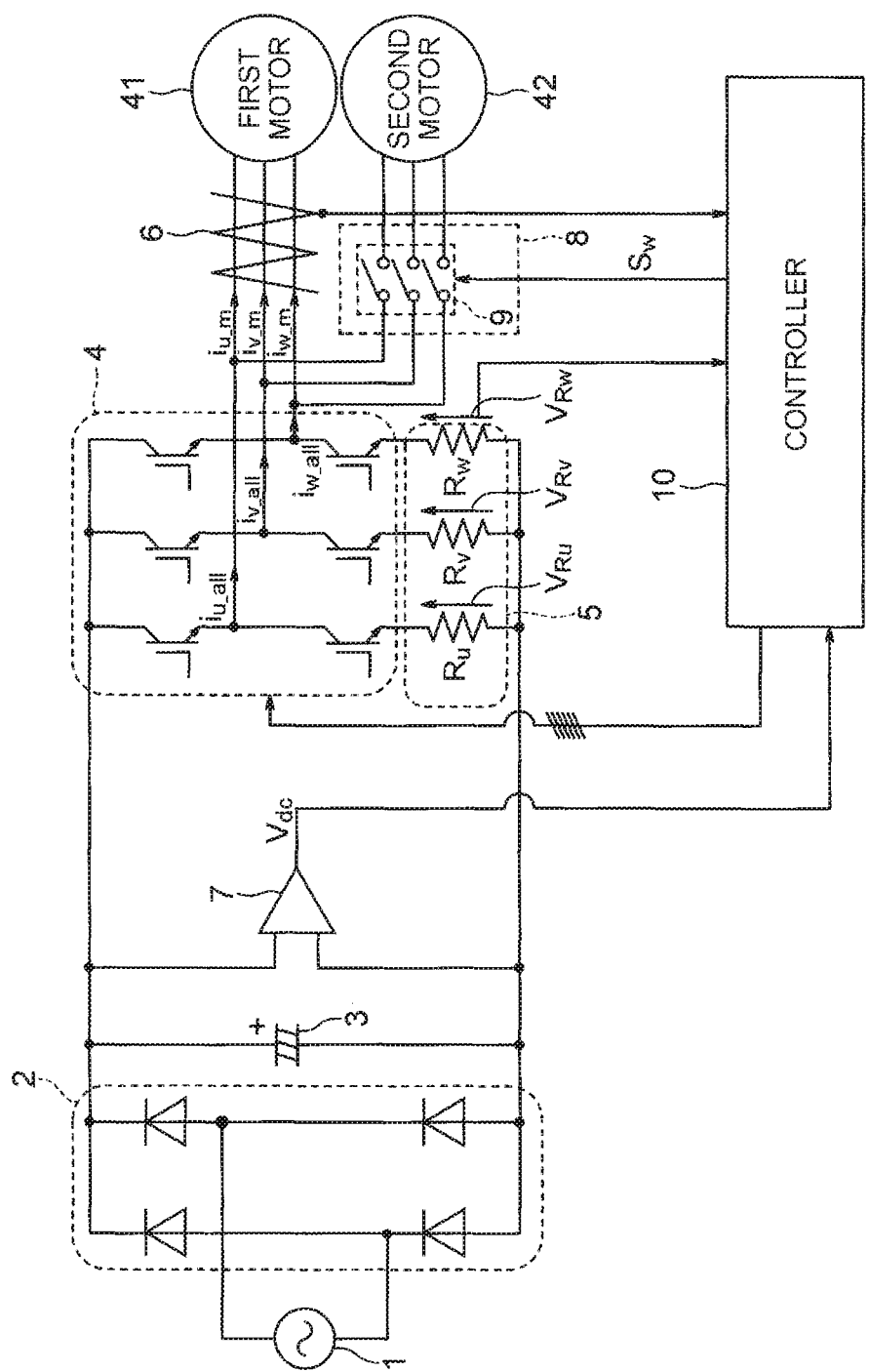
FIG. 1 is a schematic diagram illustrating an example of a configuration of a motor driving apparatus of a first embodiment of the present invention.

FIG. 1 illustrates a motor driving apparatus of a first embodiment of the present invention. The motor driving apparatus is for driving first and second permanent magnet synchronous motors 41 and 42. Hereinafter, the "permanent magnet synchronous motor" may be referred to simply as a "motor".

The illustrated motor driving apparatus includes a rectifier 2, a smoothing device 3, an inverter 4, an inverter current detector 5, a motor current detector 6, an input voltage detector 7, a connection switching device 8, and a controller 10.

The rectifier 2 rectifies alternating-current (AC) power from an AC power supply 1 to generate direct-current (DC) power.

The smoothing device 3, which is formed by a capacitor or the like, smooths the DC power from the rectifier 2 and supplies it to the inverter 4.

The AC power supply 1 is single-phase in the example of FIG. 1, but may be a three-phase power supply. When the AC power supply 1 is three-phase, a three-phase rectifier is used as the rectifier 2.

As the capacitor of the smoothing device 3, an aluminum electrolytic capacitor, which has large capacitance, is often used in general, but a film capacitor, which is long-life, may be used. A small-capacity capacitor may be used to reduce harmonics of a current flowing through the AC power supply 1.

Also, a reactor (not illustrated) may be inserted between the AC power supply 1 and the capacitor 3, in order to reduce harmonic currents or improve the power factor.

The inverter 4 receives the voltage across the capacitor 3, and outputs a three-phase AC power of variable frequency and variable voltage value.

The first motor 41 and second motor 42 are connected in parallel with each other to the output of the inverter 4.

In the illustrated example, the connection switching device 8 is formed by a single switch 9. The switch 9 can connect and disconnect the second motor 42 to and from the inverter 4. By opening and closing the switch 9, the number of the motors which are concurrently operated can be changed.

As semiconductor switching elements constituting the inverter 4, insulated gate bipolar transistors (IGBTs) or metal oxide semiconductor field effect transistors (MOSFETs) are often used.

To reduce surge voltages due to switching of the semiconductor switching elements, freewheeling diodes (not illustrated) may be connected in parallel with the semiconductor switching elements.

Parasitic diodes of the semiconductor switching elements may be used as the freewheeling diodes. In the case of MOSFETs, it is possible to provide functions similar to those of the freewheeling diodes by turning on the MOSFETs at the time of back-flow.

The material forming the semiconductor switching elements is not limited to silicon (Si), but may be wide-bandgap semiconductor, such as silicon carbide (SiC), gallium nitride (GaN), gallium oxide ($Ga_2O_3$), or diamond. By using wide-bandgap semiconductor, it is possible to reduce the power loss and increase the switching speed.

As the switch 9, an electromagnetic contactor, such as a mechanical relay or a contactor, may be used instead of a semiconductor switching element. In summary, any type of device having a similar function may be used.

In the illustrated example, the switch 9 is provided between the second motor 42 and the inverter 4. Alternatively, the switch 9 may be provided between the first motor 41 and the inverter 4. Two switches may be provided, with one between the first motor 41 and the inverter 4, and the other between the second motor 42 and the inverter 4. When two switches are provided, the two switches constitute the connection switching device 8.

In the illustrated example, two motors are connected to the inverter 4, but three or more motors may be connected to the inverter 4. When three or more motors are connected to the inverter 4, a switch similar to the switch 9 may be provided between each of all the motors and the inverter 4. Alternatively, a switch similar to the switch 9 may be provided only between each of a subset of the motors and the inverter 4. In these cases, the multiple switches constitute the connection switching device 8.

The inverter current detector 5 detects currents flowing through the inverter 4. In the illustrated example, the inverter current detector 5 determines currents (inverter currents) $i_{u\_all}$, $i_{v\_all}$, $iw_{\_all}$ of the respective phases of the inverter 4, based on the voltages $V_{Ru}$, $V_{Rv}$, $V_{Rw}$ across resistors $R_u$, $R_v$, $R_w$ connected in series with respective switching elements of three lower arms of the inverter 4.

The motor current detector 6 detects currents of the first motor 41. The motor current detector 6 includes three current transformers that detect respective currents (phase currents) $i_{u\_m}$, $i_{v\_m}$, $i_{w\_m}$ of the three phases.

The input voltage detector 7 detects an input voltage (DC bus voltage) $V_{dc}$ of the inverter 4.

The controller 10 outputs signals for operating the inverter 4, based on the current values detected by the inverter current detector 5, the current values detected by the motor current detector 6, and the voltage value detected by the input voltage detector 7.

In the above-described example, the inverter current detector 5 detects the currents of the respective phases of the inverter 4, using the three resistors connected in series with the switching elements of the lower arms of the inverter 4. Alternatively, it may detect the currents of the respective phases of the inverter 4, using a resistor connected between a common junction of the switching elements of the lower arms and a negative electrode of the capacitor 3.

Also, in addition to the motor current detector 6 for detecting the currents of the first motor 41, a motor current detector for detecting currents of the second motor may be provided.

For the detection of the motor currents, it is possible to use, instead of the current transformers, Hall elements or a configuration in which each current is calculated from the voltage across a resistor.

Similarly, for the detection of the inverter currents, it is possible to use current transformers, Hall elements, or the like, instead of the configuration in which each current is calculated from the voltage across a resistor.

The controller 10 can be implemented by processing circuitry. The processing circuitry may be implemented by dedicated hardware, software, or a combination of hardware and software. When implemented by software, the controller 10 can be formed by a microcomputer including a central processing unit (CPU), a digital signal processor (DSP), or the like.

Figure 2:
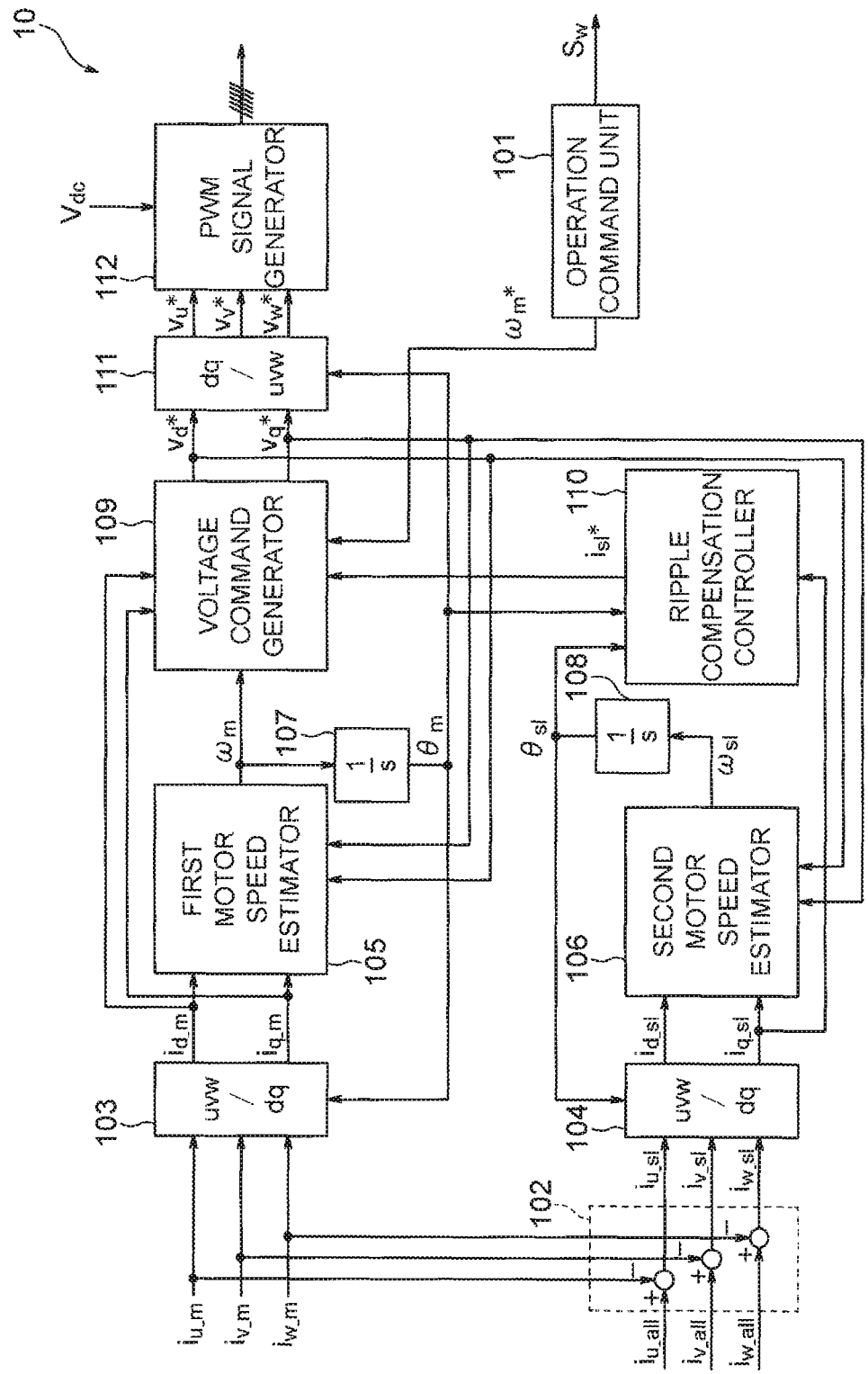
FIG. 2 is a block diagram illustrating an example of a configuration of a controller of FIG. 1.

FIG. 2 is a functional block diagram illustrating a configuration of the controller 10.

As illustrated, the controller 10 includes an operation command unit 101, a subtractor 102, coordinate converters 103, 104, speed estimators 105, 106, integrators 107, 108, a voltage command generator 109, a ripple compensation controller 110, a coordinate converter 111, and a PWM signal generator 112.

The operation command unit 101 generates and outputs a rotational frequency command value $\omega_m^*$ for the motors. The operation command unit 101 also generates and outputs a switching control signal Sw for controlling the connection switching device 8.

The subtractor 102 subtracts the phase currents $i_{u\_m}$, $i_{v\_m}$, $i_{w\_m}$ of the first motor 41 from the phase currents $i_{u\_all}$, $i_{v\_all}$, $i_{w\_all}$ of the inverter 4 detected by the inverter current detector 5, to determine phase currents $i_{u\_sl}$, $i_{v\_sl}$, $i_{w\_sl}$ of the second motor 42.

This utilizes the relation that the sums of the phase currents $i_{u\_m}$, $i_{v\_m}$, $i_{w\_m}$ of the first motor 41 and the phase currents $i_{u\_sl}$, $i_{v\_sl}$, $i_{w\_sl}$ of the second motor 42 are equal to the phase currents $i_{u\_all}$, $i_{v\_all}$, $i_{w\_all}$ of the inverter.

The coordinate converter 103 determines dq-axis currents $i_{d\_m}$, $i_{q\_m}$ of the first motor 41, by performing coordinate conversion of the phase currents $i_{u\_m}$, $i_{v\_m}$, $i_{w\_m}$ of the first motor 41 from a stationary three-phase coordinate system to a rotational two-phase coordinate system, using a phase estimated value (magnetic pole position estimated value) $\theta_m$ of the first motor 41, to be described later.

The coordinate converter 104 determines dq-axis currents $i_{d\_sl}$, $i_{q\_sl}$ of the second motor 42, by performing coordinate conversion of the phase currents $i_{u\_sl}$, $i_{v\_sl}$, $i_{w\_sl}$ of the second motor 42 from a stationary three-phase coordinate system to a rotational two-phase coordinate system, using a phase estimated value (magnetic pole position estimated value) $\theta_{sl}$ of the second motor 4, to be described later.

The first motor speed estimator 105 determines a rotational frequency estimated value $\omega_m$ of the first motor 41, based on the dq-axis currents $i_{d\_m}$, $i_{q\_m}$ and dq-axis voltage command values $v_d^*$, $v_q^*$ to be described later.

Similarly, the second motor speed estimator 106 determines a rotational frequency estimated value $\omega_{sl}$ of the second motor 42, based on the dq-axis currents $i_{d\_sl}$, $i_{q\_sl}$ and the dq-axis voltage command values $v_d^*$, $v_q^*$ to be described later.

The integrator 107 integrates the rotational frequency estimated value $\omega_m$ of the first motor 41 to determine the phase estimated value $\theta_m$ of the first motor 41.

Similarly, the integrator 108 integrates the rotational frequency estimated value $\omega_{sl}$ of the second motor 42 to determine the phase estimated value $\theta_{sl}$ of the second motor 42.

For the estimation of the rotational frequencies and the phases, the method described in Japanese Patent No. 4672236, for example, may be used. However, any other method for estimating the rotational frequencies and the phases may be used. A method for directly detecting the rotational frequencies or the phases may also be used.

The voltage command generator 109 calculates the dq-axis voltage command values $v_d^*$, $v_q^*$, based on the dq-axis currents $i_{d\_m}$, $i_{q\_m}$ of the first motor 41, the rotational frequency estimated value $\omega_m$ of the first motor 41, and a ripple compensation current command value $i_{sl}^*$ to be described later.

The coordinate converter 111 determines an applied voltage phase $\theta_2$, from the phase estimated value $\theta_m$ of the first motor 41 and the dq-axis voltage command values $v_d^*$, $v_q$, and determines voltage command values $v_u^*$, $v_v^*$, $v_w^*$ in the stationary three-phase coordinate system, by performing coordinate conversion of the dq-axis voltage command values $v_d^*$, $v_q^*$ from the rotational two-phase coordinate system to the stationary three-phase coordinate system, based on the applied voltage phase $\theta_v$.

For example, the applied voltage phase $\theta_v$ can be obtained by adding a leading phase angle $\theta_f$ to the phase estimated value $\theta_m$ of the first motor 41, the leading phase angle $\theta_f$ being obtained from the dq-axis voltage command values $v_d^*$, $v_g^*$ by $$\theta_f = \tan^{-1}(v_q^*/v_d^*).$$

Figure 3:
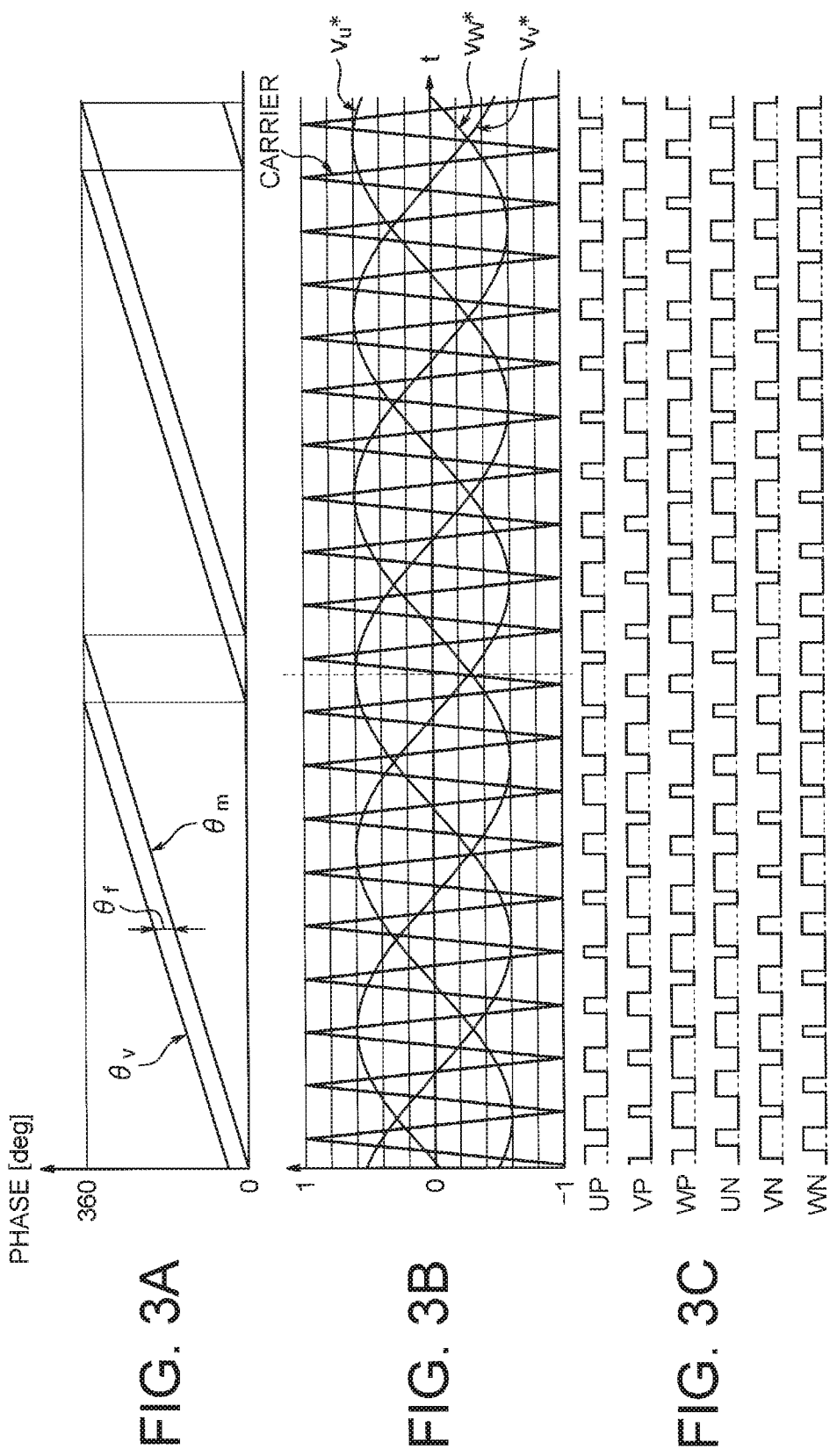
FIGS. 3A to 3C are diagrams illustrating operation of a PWM signal generator of FIG. 2.

FIG. 3A illustrates an example of the phase estimated value $\theta_m$, the leading phase angle $\theta_f$, and the applied voltage phase $\theta_2$, and FIG. 3B illustrates an example of the voltage command values $v_u^*$, $v_v^*$, $v_w^*$ determined by the coordinate converter 111.

The PWM signal generator 112 generates PWM signals UP, VP, WP, UN, VN, WN illustrated in FIG. 3C, from the input voltage $V_{dc}$ and the voltage command values $v_u^*$, $v_v^*$, $v_w^*$.

The PWM signals UP, VP, WP, UN, VN, WN are supplied to the inverter 4 and used for control of the switching elements.

The inverter 4 is provided with a driving circuit (not illustrated) for generating, based on the PWM signals UP, VP, WP, UN, VN, WN, drive signals for driving the switching elements of the respective corresponding arms.

By controlling turning on and off of the switching elements of the inverter 4 based on the above PWM signals UP, VP, WP, UN, VN, WN, AC voltages with a variable frequency and a variable voltage value can be outputted from the inverter 4, and applied to the first motor 41 and the second motor 42.

In the example illustrated in FIG. 3B, the voltage command values $v_u^*$, $v_v^*$, $v_w^*$ are sinusoidal, but the voltage command values may be ones with a third harmonic wave superimposed, and they may be of any waveform as long as they can drive the first motor 41 and the second motor 42.

If the voltage command generator 109 were configured to generate the voltage command based only on the dq-axis currents $i_{d\_m}$, $i_{q\_m}$ and the rotational frequency estimated value $\omega_m$ of the first motor 41, the first motor 41 would be controlled properly, but the second motor 42 would operate merely in accordance with the voltage command values generated for the first motor 41 without being directly controlled.

Thus, the first motor 41 and the second motor 42 would operate in a state in which there is a difference between the phase estimated value $\theta_m$ and the phase estimated value $\theta_{sl}$, and the difference would be significant especially in the low speed region.

The difference would cause ripple in the currents of the second motor 42, which might lead to step-out of the second motor 42 or increase of loss due to heat generation due to excessive current. Moreover, circuit interruption might be performed in response to excessive current, stopping the motors and preventing the load from being driven.

The ripple compensation controller 110 is provided to solve such problems, and outputs the ripple compensation current command value $i_{sl}^*$ for reducing the current ripple of the second motor 42, using the q-axis current $i_{q\_sl}$ of the second motor 42, the phase estimated value $\theta_m$ of the first motor 41, and the phase estimated value $\theta_{sl}$ of the second motor 42.

The ripple compensation current command value $i_{sl}^*$ is determined to reduce ripple in the q-axis current $i_{q\_sl}$, which corresponds to the torque current of the second motor 42, based on the phase relation between the first motor 41 and the second motor 42, which is determined based on the phase estimated value $\theta_m$ of the first motor 41 and the phase estimated value $\theta_{sl}$ of the second motor 42.

The voltage command generator 109 performs proportional-integral computation on the difference between the rotational frequency command value $\omega_m^*$ of the first motor 41 from the operation command unit 101 and the rotational frequency estimated value $\omega_m$ of the first motor 41, and determines a q-axis current command value $I_{q\_m}^*$ of the first motor 41.

The d-axis current of the first motor 41 is an excitation current component, and, by varying its value, it is possible to control the current phase, and to drive the first motor 41 with flux strengthening or flux weakening. Taking advantage of such characteristics, it is possible to control the current phase by applying the above-mentioned ripple compensation current command value $i_{sl}^*$ to a d-axis current command value $I_{d\_m}^*$ of the first motor 41, thereby reducing the ripple.

The voltage command generator 109 determines the dq-axis voltage command values $v_d^*$, $v_q^*$ based on the dq-axis current command values $I_{d\_m}^*$, $I_{q\_m}^*$ determined as above and the dq-axis currents $i_{d\_m}$, $i_{q\_m}$ determined by the coordinate converter 103. Specifically, it performs proportional-integral computation on the difference between the d-axis current command value $I_{d\_m}^*$ and the d-axis current $i_{d\_m}$ to determine the d-axis voltage command value $v_d^*$, and performs proportional-integral computation on the difference between the q-axis current command value $I_{q\_m}^*$ and the q-axis current $i_{q\_m}$ to determine the q-axis voltage command value $v_q^*$.

The voltage command generator 109 and the ripple compensation controller 110 may be of any configuration as long as they can provide the same functions.

By performing the control described above, it is possible to drive the first motor 41 and the second motor 42 with the single inverter 4 without causing ripple in the second motor 42.

The above describes the basic configurations of the motor driving apparatus of the present embodiment and its controller with reference to FIGS. 1, 2, and 3A to 3C.

Hereinafter, a circuit configuration and a process for performing braking operation on the motors in free running states.

The free running state refers to a state in which, although no power is being supplied from the inverter to the motor, the motor is rotating, for example, with rotation of a fan due to external wind.

Figure 4:
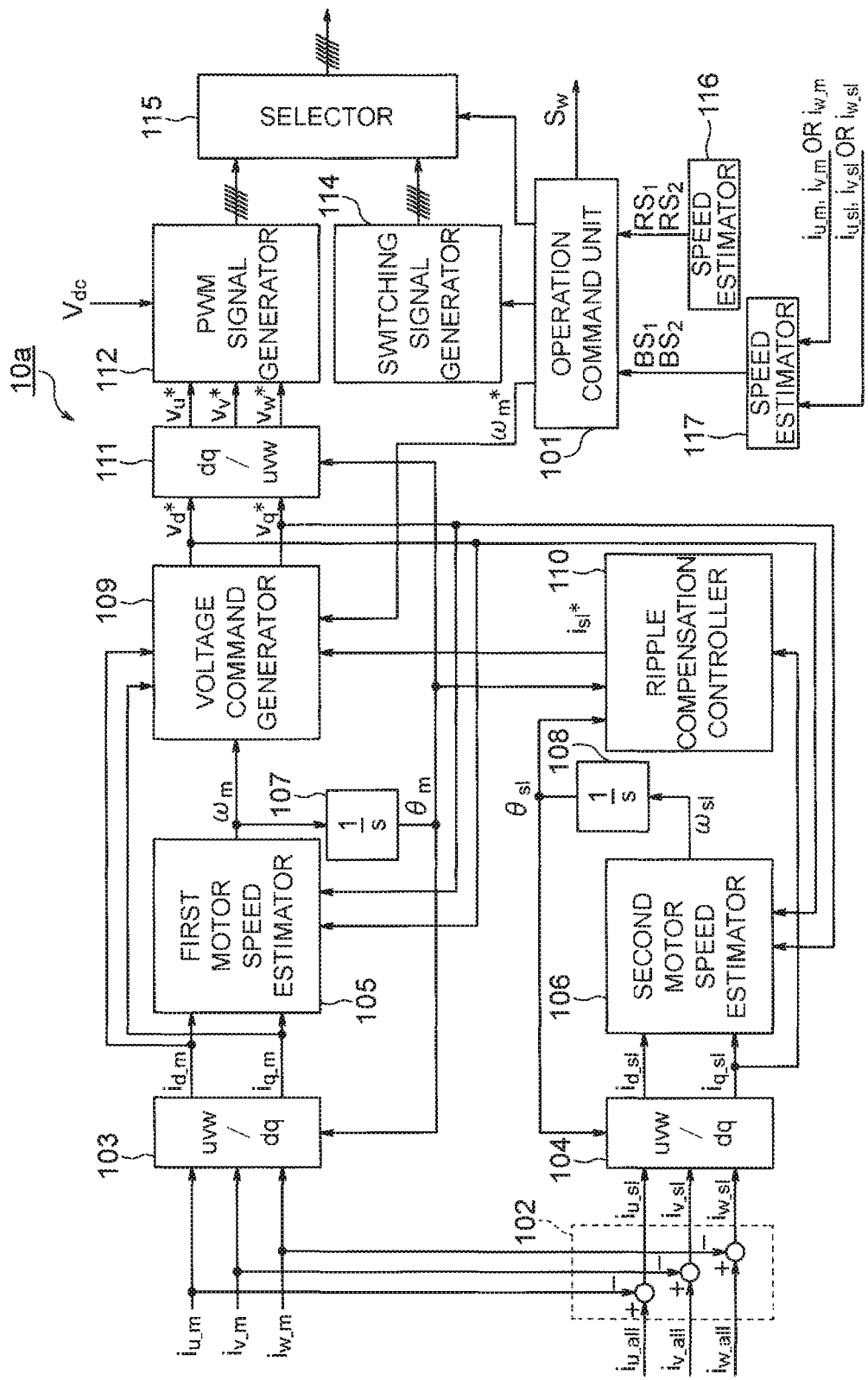
FIG. 4 is a functional block diagram illustrating an example of a more specific configuration of a controller used in the first embodiment.

FIG. 4 illustrates a controller 10a used in the present embodiment. The controller 10a illustrated in FIG. 4 includes a switching signal generator 114, a selector 115, a speed estimator 116, and a speed estimator 117, in addition to the basic configuration of the controller 10 illustrated in FIG. 2.

The speed estimator 116 estimates rotational speeds $RS_1$, $RS_2$ of the motors 41, 42 in a state in which the motors 41, 42 are not being driven by the inverter 4.

The speed estimator 117 estimates rotational speeds $BS_1$, $BS_2$ of the motors 41, 42 when braking operation is being performed on the motors 41, 42.

The operation command unit 101 determines whether the motors 41, 42 are in the free running states.

For each motor, the determination as to whether the motor is in the free running state is made based on, for example, whether although the motor is not being driven by the inverter 4, the motor is rotating at a rotational frequency not lower than a predetermined threshold.

The rotational speeds $RS_1$, $RS_2$ of the respective motors are estimated by the speed estimator 116 and provided to the operation command unit 101.

For the estimation of the speeds by the speed estimator 116, the method described in International Publication No. WO 2008/001445 can be used, for example.

When the motors 41, 42 need to be started, the operation command unit 101 determines whether the motors 41, 42 are in the free running states, and when it is determined that the motors 41, 42 are in the free running states, performs braking operation on the motors 41, 42 prior to the start.

This is performed because, if voltage were applied to the motors in the free running states from the inverter 4, excessive current might flow.

In the braking operation, the operation command unit 101 controls the switch 9, the switching signal generator 114, and the selector 115.

The switching signal generator 114 generates, for each of the switching elements of the respective arms of the inverter 4, a signal for performing PWM control on the switching element, a signal for keeping the switching element on continuously (a signal for maintaining the on state), or a signal for keeping the switching element off continuously (a signal for maintaining the off state). The switching signal generator 114 can supply different signals to the switching elements of the different arms of the inverter 4. For example, it can supply the switching element of one of the arms with the signal for keeping it off continuously, and supply each of the switching elements of the other arms with the signal for keeping it on continuously or the signal for performing PWM control on it.

The selector 115 selects the output of the PWM signal generator 112 or the output of the switching signal generator 114, and supplies it to the inverter 4.

When the motors 41, 42 are driven by the inverter 4, the selector 115 selects the output of the PWM signal generator 112.

When braking operation is performed on the motors 41, 42, the selector 115 selects the output of the switching signal generator 114.

During the braking operation, the switch 9 is controlled to allow current to flow from the second motor 42 to the inverter 4 or the first motor 41, or block such current.

The switch 9 is controlled by the switching control signal Sw output from the operation command unit 101.

The speed estimator 117 estimates the rotational speeds $BS_1$, $BS_2$ of the motors 41, 42 during the braking operation.

In the illustrated example, the speed estimator 117 estimates, for each motor, the rotational speed of the motor based on at least one of the phase currents of the motor.

For example, the speed estimator 117 estimates the rotational speed $BS_1$ of the first motor 41 based on at least one of the phase currents $i_{u\_m}$, $i_{v\_m}$, $i_{w\_m}$ of the first motor 41 detected by the motor current detector 6. Similarly, the speed estimator 117 estimates the rotational speed $BS_2$ of the second motor 42 based on at least one of the phase currents $i_{u\_sl}$, $i_{v\_sl}$, $i_{w\_sl}$ of the second motor 42 obtained by the subtractor 102.

For example, the speed estimator 117 may estimate, for each motor, the rotational speed of the motor by measuring the period of appearance of zero crossing points of at least one of the phase currents of the motor.

Alternatively, the speed estimator 117 may estimate, for each motor, the rotational speed of the motor based on the magnitude of at least one of the phase currents of the motor. This estimation utilizes the relation that the phase currents increase as the rotational speed increases. For example, it is possible to determine, as the estimated value of the rotational speed, a value obtained by multiplying the magnitude of at least one of the phase currents by a predetermined constant.

A procedure of a process of braking operation on the two motors will be described below with reference to FIG. 5.

In the following description, turning on and off of the switching element of each arm may be referred to simply as turning on and off of the arm, and PWM control on the switching element of each arm may be referred to simply as PWM control on the arm.

In an initial state (step ST11) when the braking operation is started, the upper arms and lower arms of the inverter 4 are all placed in off states, and the switch 9 is placed in an open state.

For the control of the inverter 4, the switching signal generator 114 is caused to output signals for keeping all the arms off continuously. Thereby, no current path is formed between the motors 41, 42 and the inverter 4, and no current flows through the motors and the inverter 4 even when the motors are free running. This can reduce the risks of demagnetization of each motor and failure of the inverter due to overcurrent.

When the braking operation is started, one or more of the upper arms of the inverter 4, or one or more of the lower arms of the inverter 4 are first turned on in step ST12. For this purpose, the switching signal generator 114 is caused to output signals for keeping the one or more arms on continuously or PWM signals for intermittently turning on the one or more arms at certain duty cycles. This can form a current path between the inverter 4 and the motor 41 to allow current due to induced voltage of the motor 41 to flow therethrough, thereby consuming regenerative energy of the motor 41 and braking the motor 41.

Figure 6:
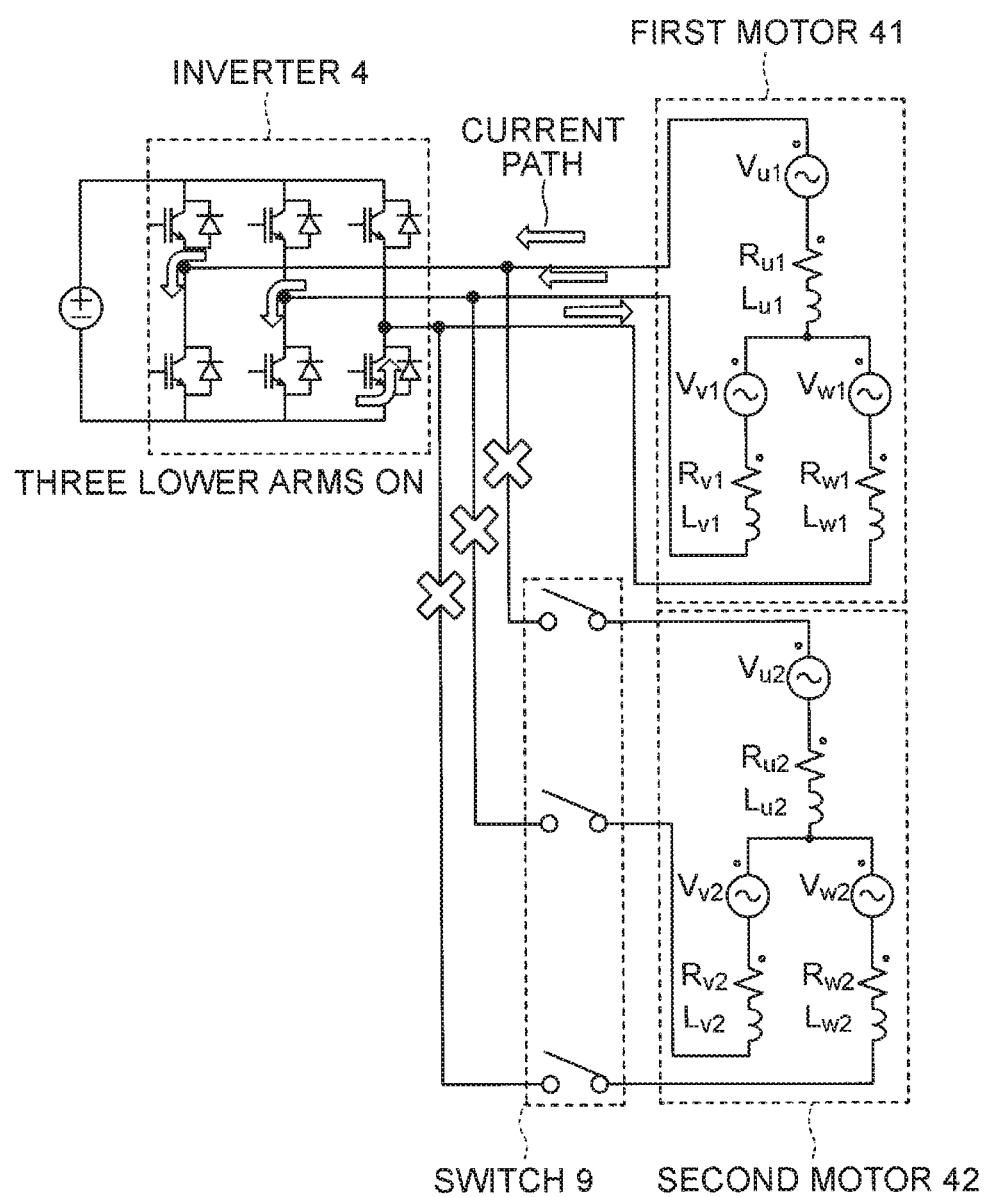
FIG. 6 is a diagram illustrating a current path in braking operation on a first motor in the first embodiment.

For example, when all the three lower arms are turned on, the current path as illustrated in FIG. 6 is formed. In FIG. 6, $V_{u1}, V_{v1}, V_{w1}$ are induced voltages of the first motor 41; $R_{u1}$, $R_{v1}, R_{w1}$ are resistances of the first motor 41; and $L_{u1}, L_{v1}$, $L_{w1}$ are inductances of the first motor 41. Also, in FIG. 6, $V_{u2}, V_{v2}, V_{w2}$ are induced voltages of the second motor 42; $R_{u2}, R_{v2}, R_{w2}$ are resistances of the second motor 42; $L_{u2}$, $L_{v2}, L_{w2}$ are inductances of the second motor 42. The same applies to similar drawings described below.

In turning them on, it is possible to keep them on continuously (at duty cycles of 100%), or perform PWM control to adjust the duty cycles to values not greater than 100%. When they are kept on continuously, the braking force during the braking is great, but the current values during the braking are large, compared to when the PWM control is performed. Thus, it is desirable to select keeping them on continuously or performing the PWM control, in view of the required braking force and the allowable current value.

Then, in step ST13, the operation command unit 101 compares the rotational speed $BS_1$ of the motor 41 to a predetermined threshold.

When the estimated rotational speed $BS_1$ is higher than the threshold (NO in step ST13), the process returns to step ST12, and the braking operation on the motor 41 is continued.

When the estimated rotational speed $BS_1$ is not higher than the threshold (YES in step ST13), the process proceeds to step ST14.

In step ST14, one or more of the upper arms of the inverter 4, or one or more of the lower arms of the inverter 4 are turned on, and the switch 9 is placed in a closed state. As a result of the closing of the switch 9, current due to induced voltage of the motor 42 flows through the inverter 4 and the motor 41.

There may be a restriction that the arms turned on in step ST12 and the arms turned on in step ST14 must be on the same side of the inverter 4. Here, the "same side" refers to the same side, either the upper or lower side of the inverter 4. For example, it is possible that, when one or more of the upper arms are turned on in step ST12, one or more of the upper arms are turned on also in step ST14, and when one or more of the lower arms are turned on in step ST12, one or more of the lower arms are turned on also in step ST14.

However, the number of the arms turned on in step ST14 or the duty cycles of the arms turned on in step ST14 may differ from that or those in step ST12.

Figure 7:
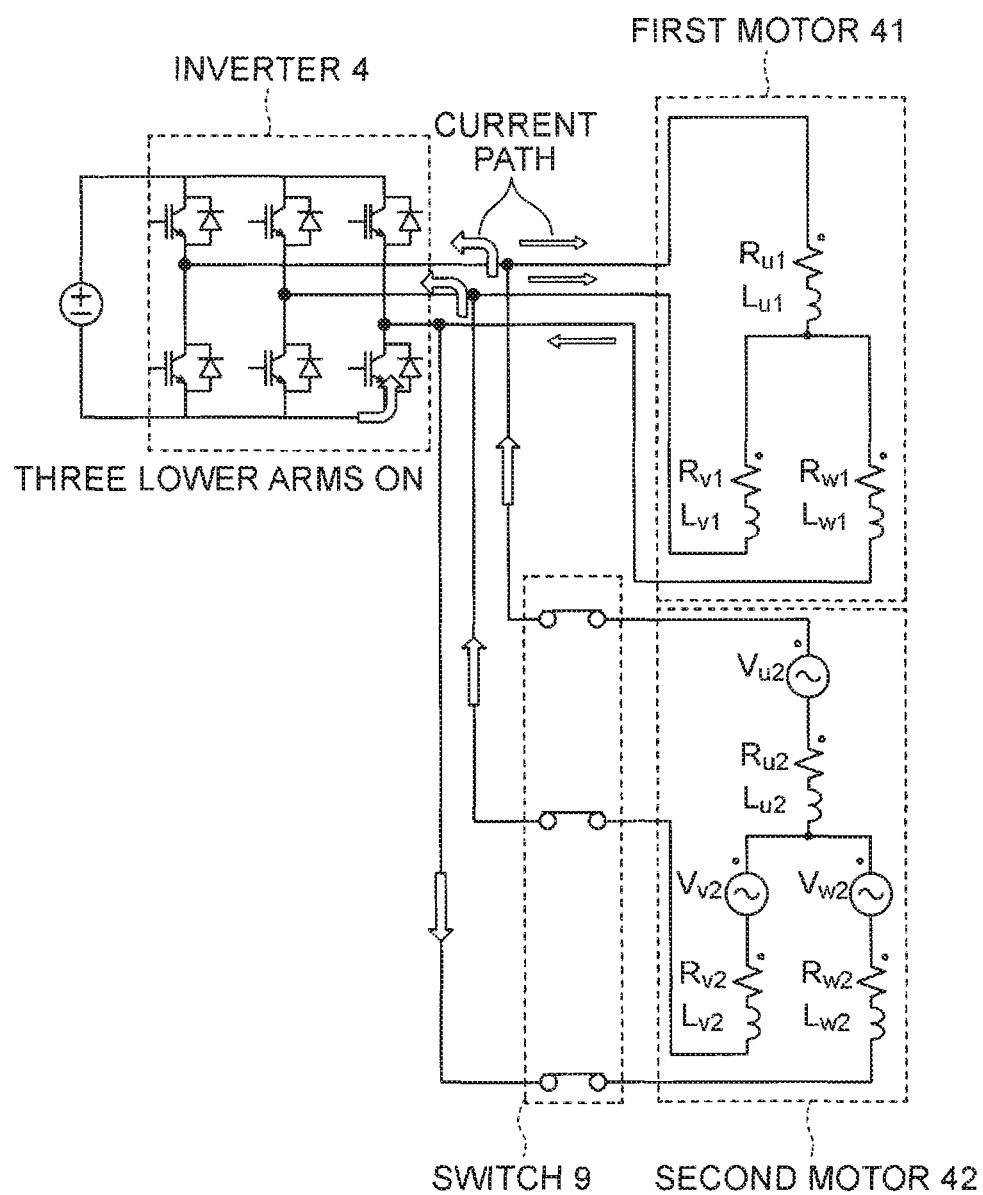
FIG. 7 is a diagram illustrating a current path in braking operation on a second motor in the first embodiment.

The lower the rotational speed $BS_1$ of the motor 41 braked in step ST12, the lower the induced voltage of the motor 41. Thus, it can be considered that the motor 41 is connected to the motor 42 as an RL circuit, as illustrated in FIG. 7. Thus, it can be considered that part of the current due to the induced voltage of the motor 42 flows through the inverter 4, and the remainder flows through the motor 41.

For example, when the braking operation is performed with all the lower arms of the inverter 4 turned on, the RL circuit formed by the motor 41 is higher in impedance than the inverter 4, and thus most of the current flowing due to the induced voltage of the motor 42 flows through the inverter 4. Thus, it is possible to brake the motor 42 without causing excessive circulating current between the motor 41 and the motor 42.

In step ST15, the operation command unit 101 compares the rotational speed $BS_2$ of the second motor 42 to a predetermined threshold.

When the rotational speed $BS_2$ of the second motor 42 is higher than the threshold (NO in step ST15), the process returns to step ST14, and the braking operation is continued.

When the rotational speed $BS_2$ of the second motor 42 is not higher than the threshold (YES in step ST15), the process ends.

After the end of the process, when the two motors 41, 42 are both driven, the switch 9 is maintained in the closed state. When only the motor 41 is driven, the switch 9 is set to the open state. The selector 115 is placed in a state in which it selects the output of the PWM signal generator 112.

Figure 8:
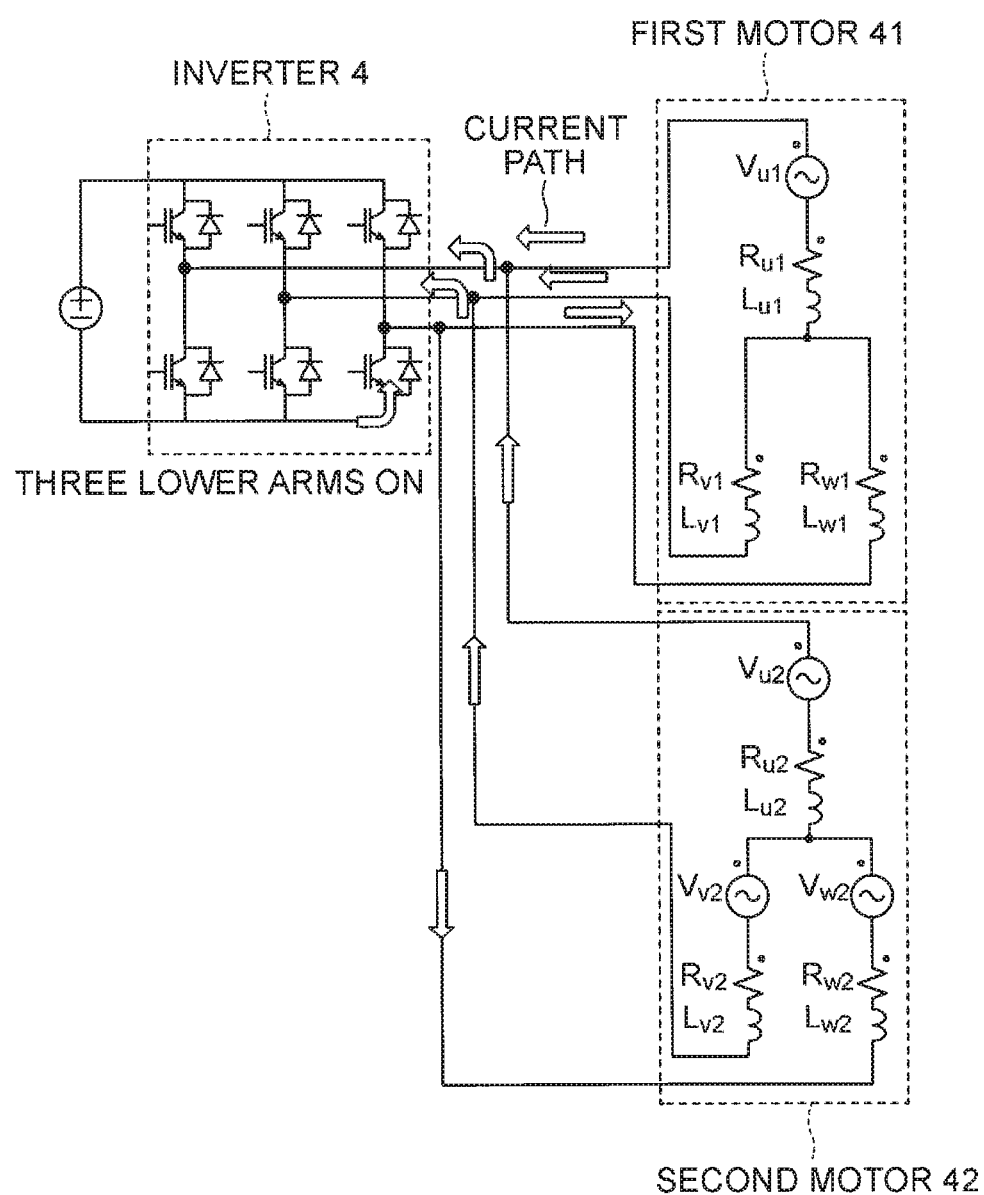
FIG. 8 is a diagram illustrating a current path in braking operation in a comparative example.

If the switch 9 were not provided and the two motors were simultaneously braked, the sum of the currents due to the induced voltage of the two motors would flow through the inverter 4 as in FIG. 8, and the inverter 4 might fail due to overcurrent. In the present embodiment, since the two motors are braked at different times, the magnitude of the current flowing through the inverter 4 can be approximately halved compared to the case of FIG. 8. This can reduce the risks of failure of the inverter and demagnetization of the motors due to overcurrent.

It is also possible to reduce the cost by reducing the current capacity of the inverter, compared to the case of FIG. 8.

Second Embodiment

A second embodiment of the present invention will be described.

A controller used in the present embodiment has the same configuration as that illustrated in FIG. 4.

Figure 9:
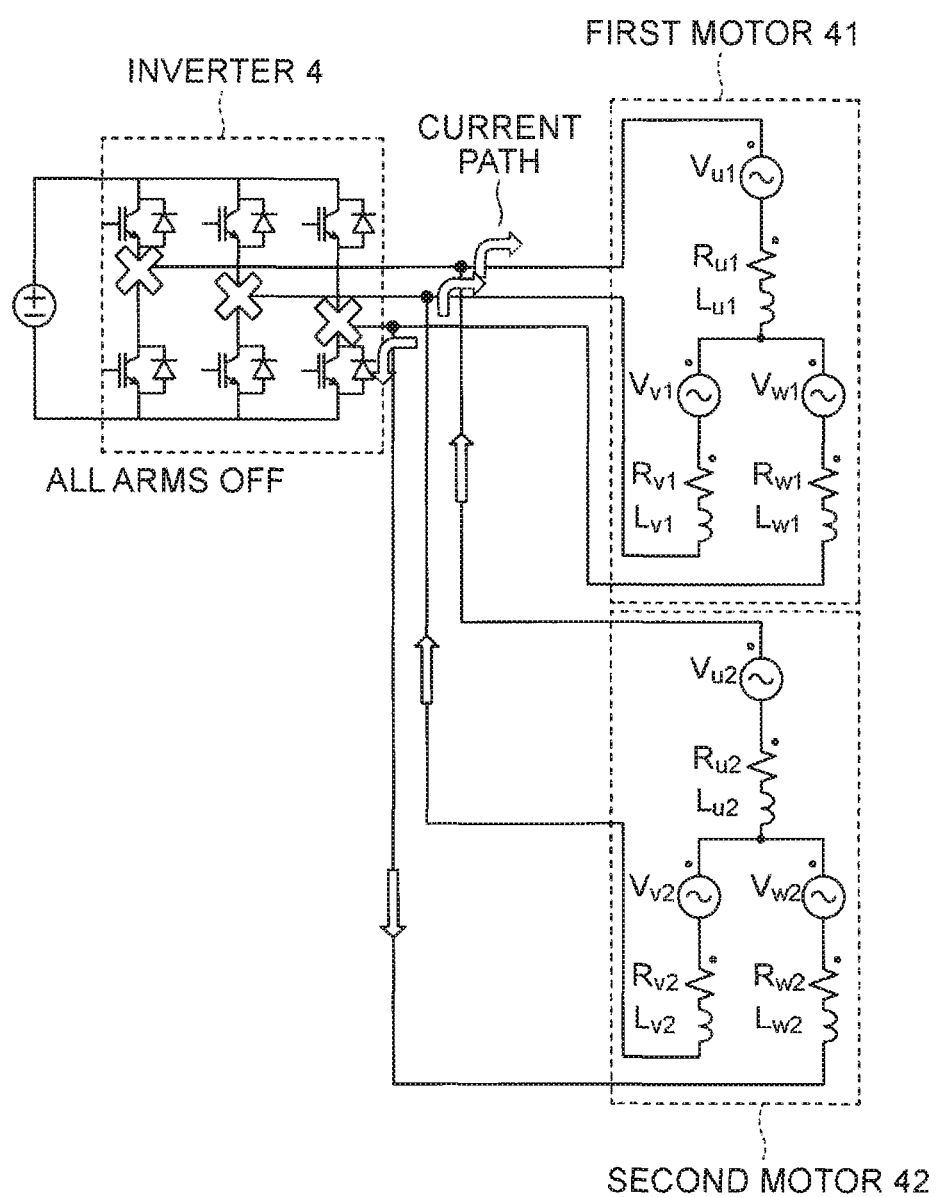
FIG. 9 is a diagram illustrating a current path in braking operation in another comparative example.

If, in the configuration in which the switch 9 is not provided, the motor 41 and the motor 42 were in regeneration states due to free running or the like with all the arms of the inverter 4 in the off states, circulating current would flow between the two motors due to the difference between the rotational speeds or the phase difference between the induced voltages, as illustrated in FIG. 9. The magnitude of the circulating current would be maximum when the phase difference between the induced voltages is 180 degrees. When the circulating current is great, the motors might be demagnetized due to overcurrent. To reduce the circulating current under the same rotational speeds, it would be required to reduce the induced voltages of the motors or increase the resistances of the motors. However, both would degrade the efficiency of the motors and be undesirable.

Figure 10:
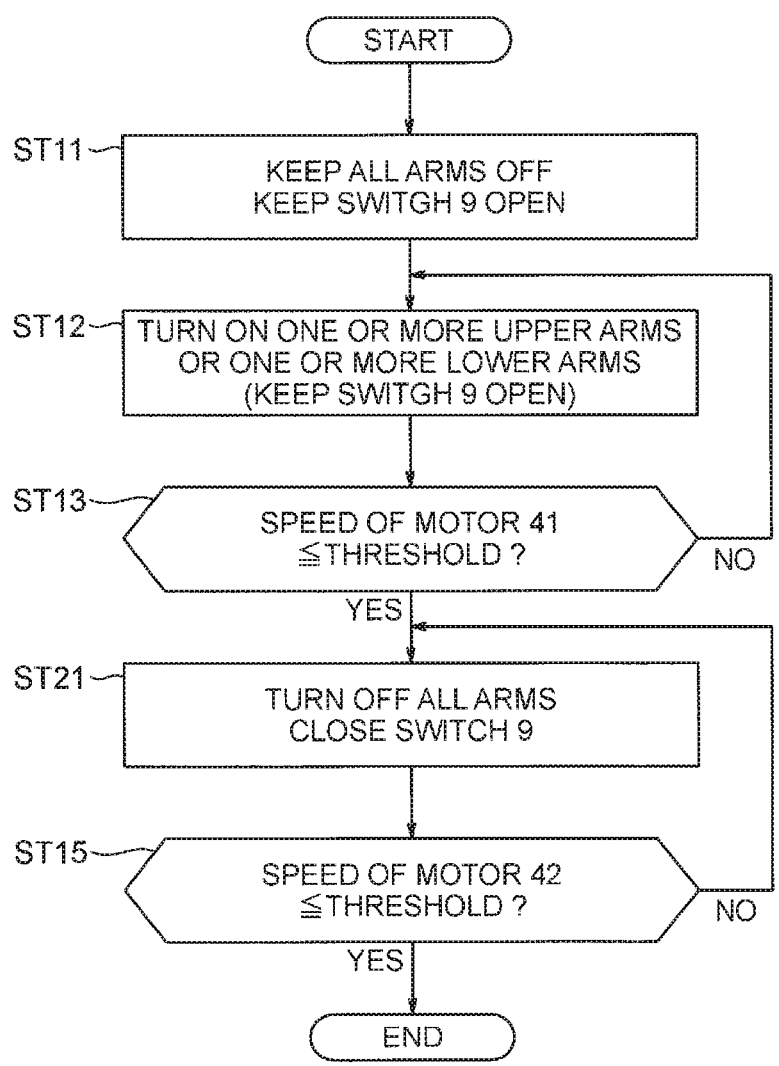
FIG. 10 is a flowchart illustrating a process in braking operation in a second embodiment of the present invention.

Thus, the second embodiment performs the control illustrated in FIG. 10.

Figure 5:
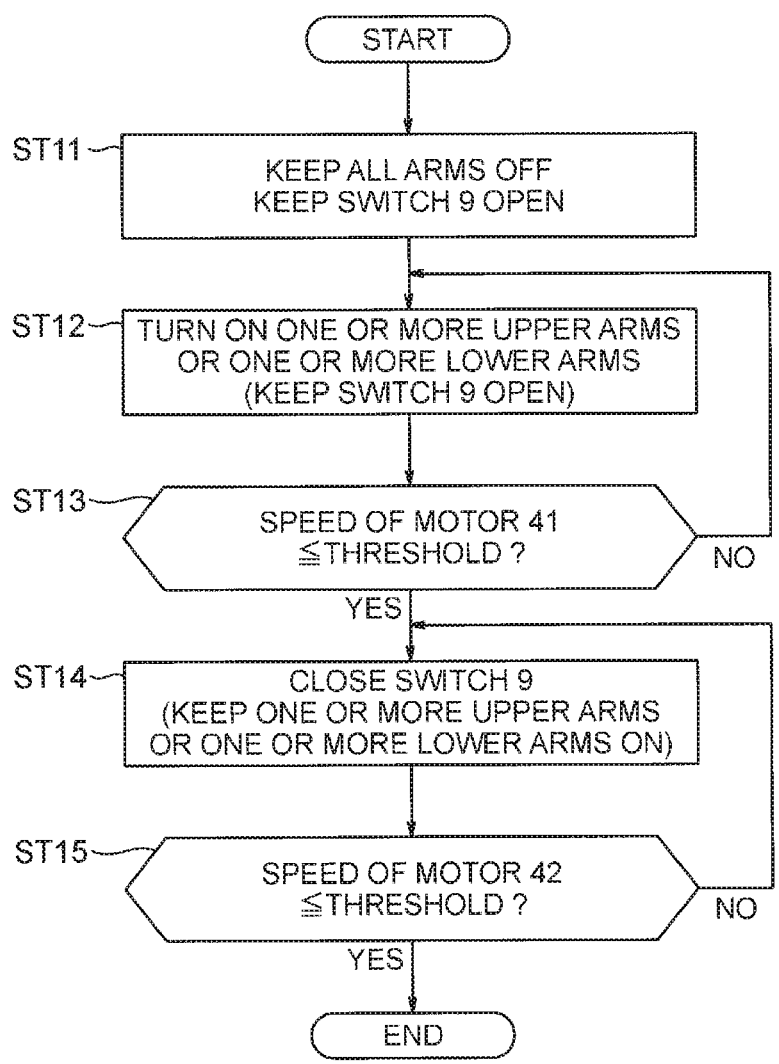
FIG. 5 is a flowchart illustrating a process in braking operation in the first embodiment.

The process of FIG. 10 is generally the same as the process of FIG. 5. It differs in that the processing of step ST21 is performed instead of step ST14 in FIG. 5.

Steps ST11 to ST13 and ST15 in FIG. 10 are the same as those described in the first embodiment with reference to FIG. 5.

In step ST21, all the arms of the inverter 4 are turned off, and then the switch 9 is closed.

As a result of the braking in step ST12, the induced voltage generated by the motor 41 has decreased with decrease in the rotational speed of the motor 41. When the switch 9 is closed at this time, it can be considered that the motor 41 is connected to the motor 42 as an RL circuit. Thus, current due to the induced voltage of the motor 42 flows through the motor 41.

Figure 11:
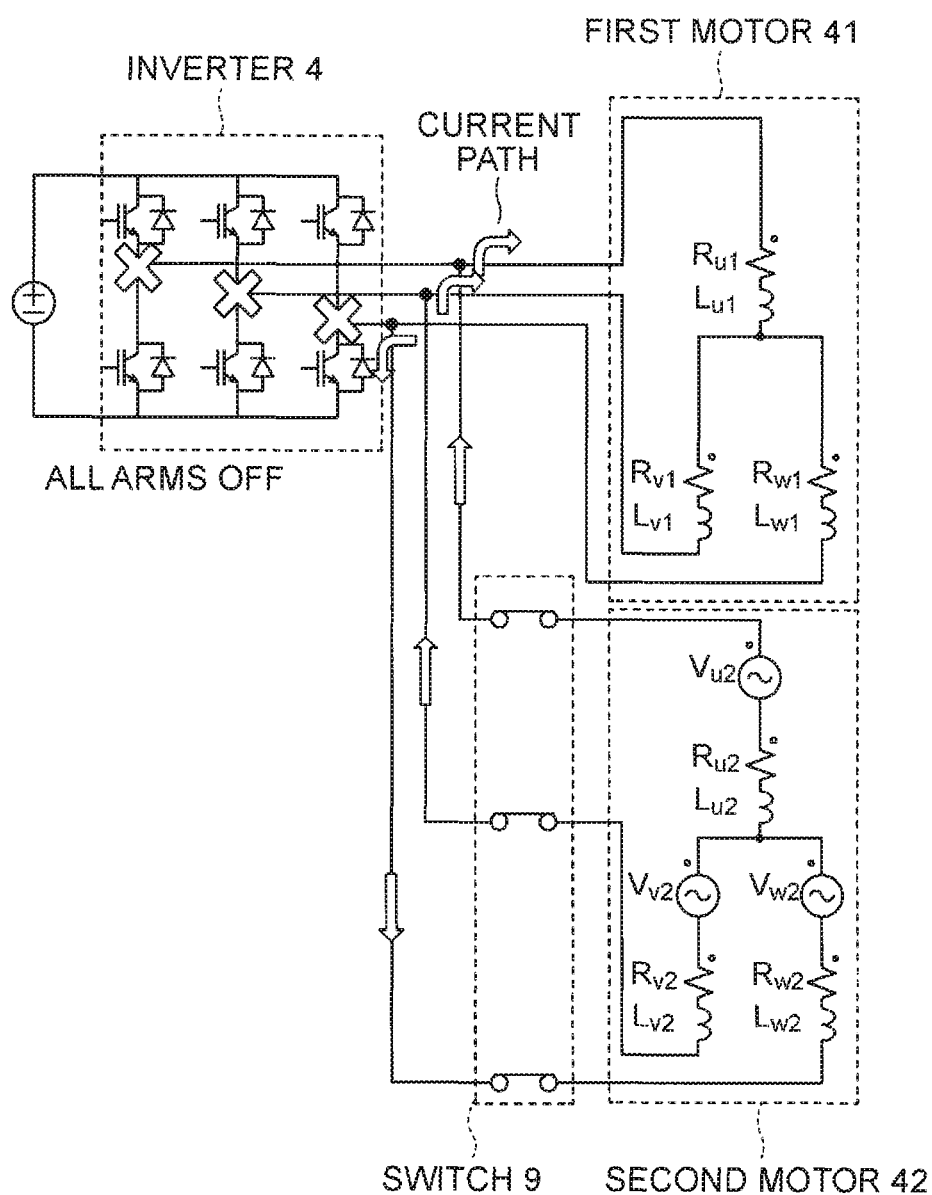
FIG. 11 is a diagram illustrating a current path in braking operation on a second motor in the second embodiment.

Also, in step ST21, since all the arms of the inverter 4 are turned off, no current flows through the inverter 4 as illustrated in FIG. 11. Thus, circulating current flows between the motor 41 and the motor 42, and the motor 42 is braked due to the circulating current.

The magnitude of the circulating current is smaller than that in the case of FIG. 9. For example, when the resistance values and inductance values of the motor 41 are roughly equal to those of the motor 42, the magnitude of the circulating current is about half that in the case of FIG. 9. This is because the switch 9 is closed after the rotational speed of the motor 41 has sufficiently decreased in step ST12 to ST13.

Thus, it is possible to reduce the risks of failure of the inverter and demagnetization of the motors due to overcurrent without causing reduction in the efficiency of the motors or the like.

Third Embodiment

A third embodiment of the present invention will be described.

Figure 12:
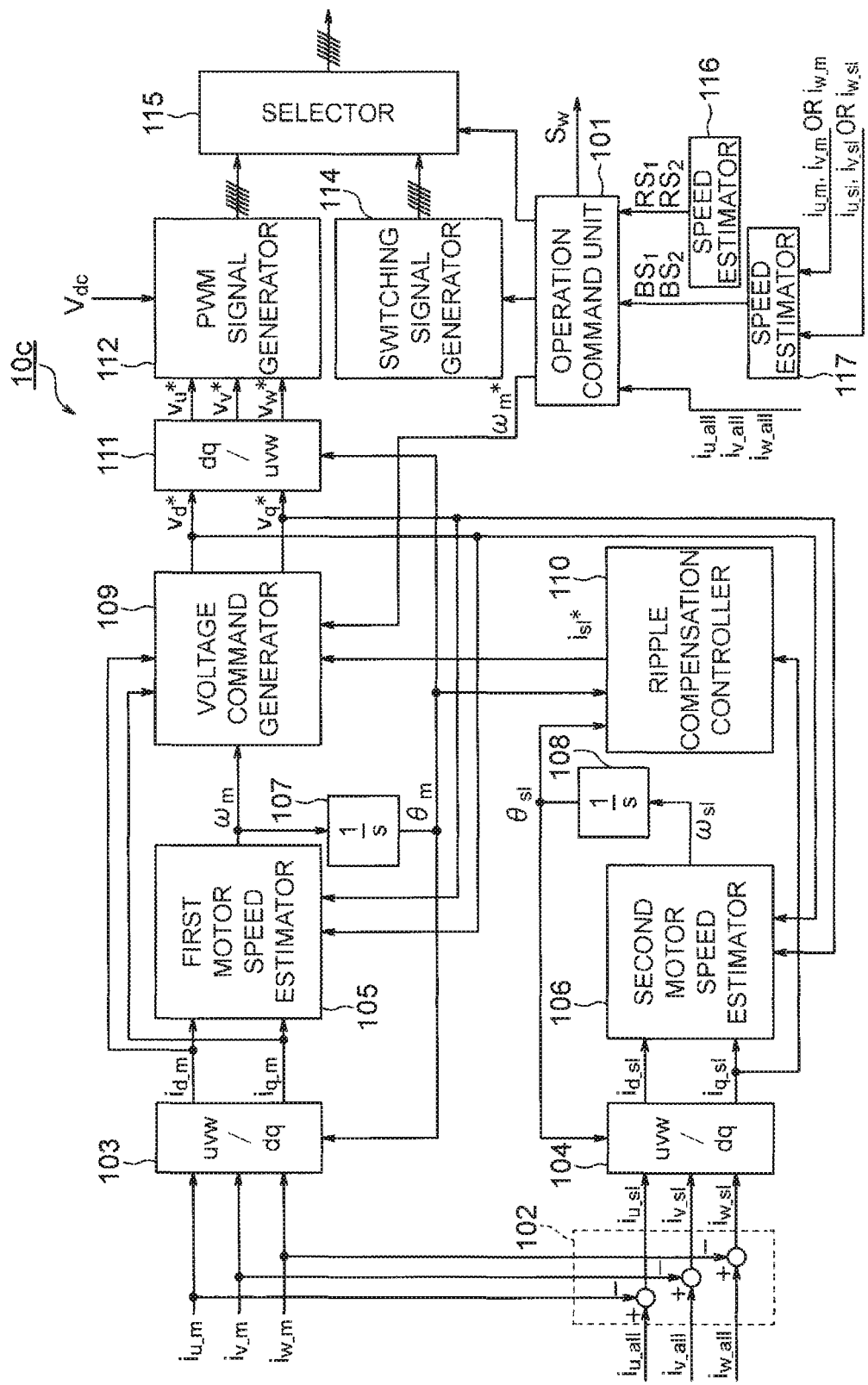
FIG. 12 is a functional block diagram illustrating an example of a configuration of a controller used in a third embodiment of the present invention.
Figure 13:
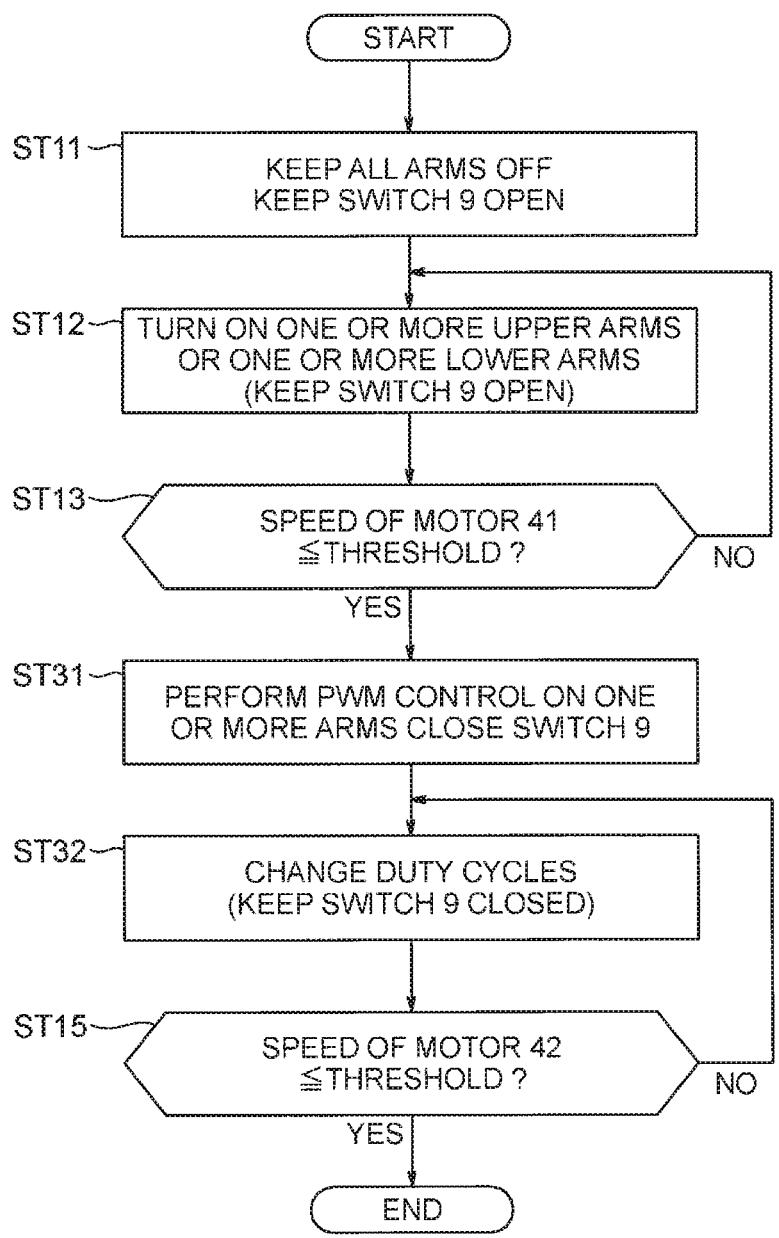
FIG. 13 is a flowchart illustrating a process in braking operation in the third embodiment.

In the third embodiment, a controller 10c illustrated in FIG. 12 is used instead of the controller 10a illustrated in FIG. 4, and the braking operation is performed according to the procedure illustrated in FIG. 13.

The controller 10c illustrated in FIG. 12 is generally the same as the controller 10a illustrated in FIG. 4. However, the inverter currents $i_{u\_all}$, $i_{v\_all}$, $i_{w\_all}$ detected by the inverter current detector 5 are input to the operation command unit 101, and the operation command unit 101 also uses the inverter currents $i_{u\_all}$, $i_{v\_all}$, $i_{w\_all}$ when performing the braking operation.

The process of FIG. 13 is generally the same as the process of FIG. 5, and the same or similar steps are given the same reference characters.

The process of FIG. 13 differs in that steps ST31 and ST32 are performed instead of step ST14 in the process of FIG. 5.

Hereinafter, a procedure of the process of the third embodiment will be described with reference to FIG. 13.

Steps ST11 to ST13 in FIG. 13 are the same as those described in the first embodiment with reference to FIG. 5.

Subsequent to step ST13, in step ST31, the switch 9 is closed, and the braking operation on the motor 42 is started.

As in the first embodiment, the induced voltage of the motor 41 has decreased with decrease in the rotational speed of the motor 41 braked in step ST12, and it can be considered that the motor 41 is connected to the motor 42 as an RL circuit, and part of the current due to the induced voltage of the motor 42 flows through the inverter 4, and the remainder flows through the motor 41.

In step ST31, PWM control is performed on one or more of the upper arms of the inverter 4, or one or more of the lower arms of the inverter 4.

There may be a restriction that the arms turned on in step ST12 and the arms turned on in step ST31 must be on the same side of the inverter 4. For example, it is possible that, when one or more of the upper arms are turned on in step ST12, one or more of the upper arms are PWM-controlled also in step ST31, and when one or more of the lower arms are turned on in step ST12, one or more of the lower arms are PWM-controlled also in step ST31. However, the number of the arms PWM-controlled in step ST31 or the duty cycles in step ST31 may differ from that or those in step ST12.

Figure 14:
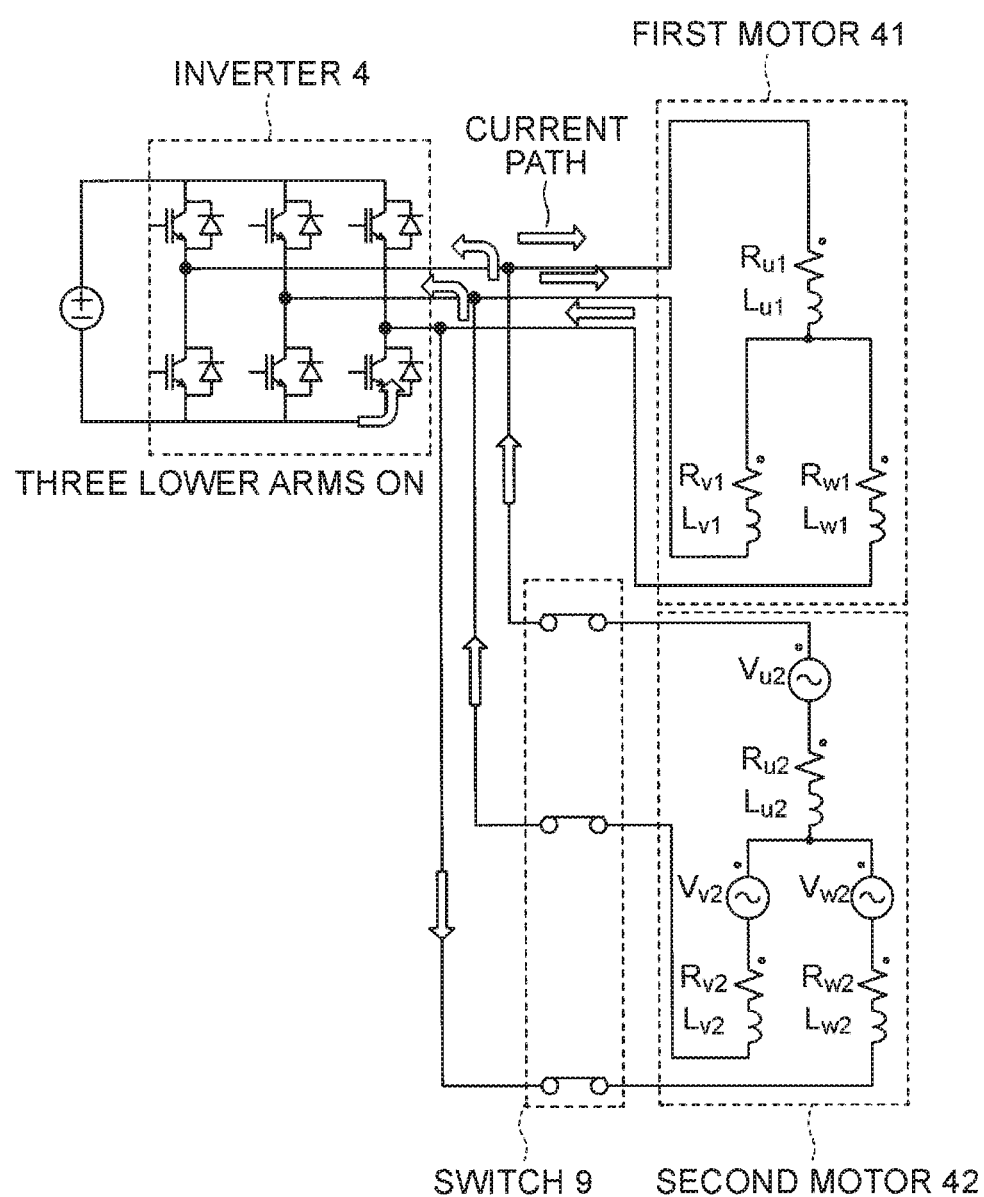
FIG. 14 is a diagram illustrating a current path in braking operation on a second motor in the third embodiment.

As a result of the processing in step ST31, part of the current due to the induced voltage of the motor 42 flows through the motor 41 and the remainder flows through the inverter 4, as illustrated in FIG. 14.

The PWM duty cycles are arbitrarily set in a range of 0 to 100%. The duty cycles are set by the operation command unit 101, and the switching signal generator 114 generates the PWM signals in accordance with the duty cycles. By controlling the duty cycles, it is possible to control ratios between the magnitudes of the currents $i_{u\_all}$, $i_{v\_all}$, $i_{w\_all}$ flowing through the inverter 4 and the magnitudes of the currents $i_{u\_m}$, $i_{v\_m}$, $i_{w\_m}$ flowing through the motor 41 when the braking operation is being performed on the motor 42.

In step ST32, the operation command unit 101 changes the duty cycles as needed, based on the inverter currents $i_{u\_all}$, $i_{v\_all}$, $i_{w\_all}$ detected by the inverter current detector 5 and the motor currents $i_{u\_m}$, $i_{v\_m}$, $i_{w\_m}$ detected by the motor current detector 6.

For example, when the motor currents $i_{u\_m}$, $i_{v\_m}$, $i_{w\_m}$ are excessive and there is a possibility that the demagnetization occurs, the currents flowing through the motor 41 are reduced by increasing the duty cycles.

Conversely, when the inverter currents $i_{u\_all}$, $i_{v\_all}$, $i_{w\_all}$ are excessive and there is a possibility that the inverter 4 fails, the currents flowing through the inverter 4 are reduced by decreasing the duty cycles.

It is also possible to control the duty cycles of the inverter 4 so that a ratio of the current flowing through the inverter 4 to a current capacity of the inverter 4 is equal to a ratio of the current flowing through the motor 41 to a maximum allowable current of the motor 41. The "maximum allowable current" here refers to a maximum value of a range in which the demagnetization (irreversible demagnetization) can be avoided.

By performing such feedback control, it is possible to optimally control a ratio between the inverter currents and the currents flowing through the motor 41.

In step ST15, the operation command unit 101 compares the rotational speed $BS_2$ of the second motor 42 to a predetermined threshold, and when the rotational speed $BS_2$ of the second motor 42 is higher than the threshold (NO in step ST15), the process returns to step ST32, and the braking operation is continued.

In step ST15, when the rotational speed $BS_2$ of the second motor 42 is not higher than the threshold (YES in step ST15), the process ends.

By performing the braking operation according to the above procedure, it is possible to reduce inrush current to the inverter 4 and the motor 41 in the braking, and regulate the amount of heat generation in the braking. Thus, it is possible to reduce the risks of failure of the inverter and demagnetization of the motors due to overcurrent, temperature rise, or the like.

Fourth Embodiment

A fourth embodiment of the present invention will be described.

Figure 15:
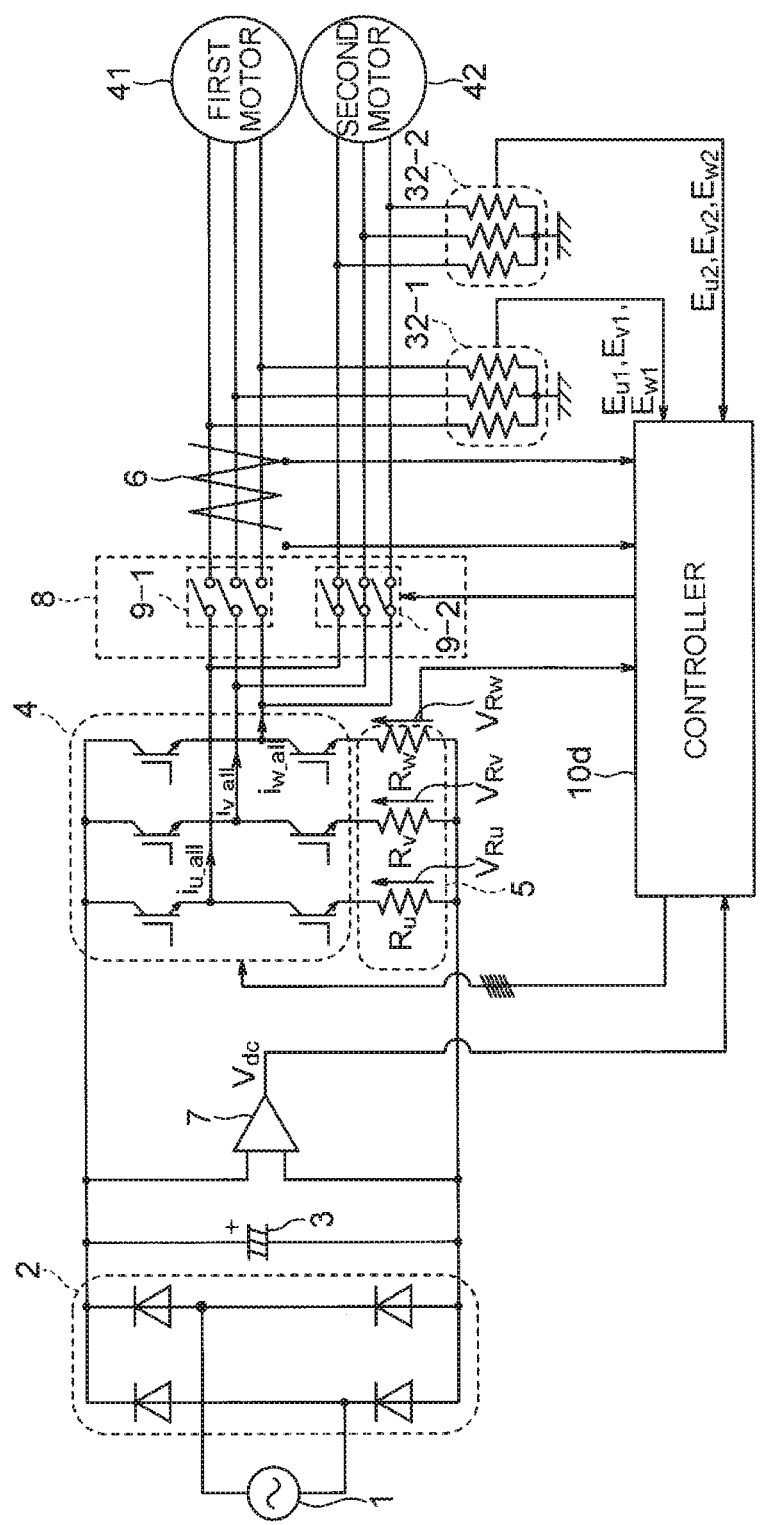
FIG. 15 is a schematic diagram illustrating a motor driving apparatus of a fourth embodiment of the present invention.

FIG. 15 illustrates a motor driving apparatus of the fourth embodiment.

The motor driving apparatus illustrated in FIG. 15 is generally the same as the motor driving apparatus illustrated in FIG. 1. However, the connection switching device 8 includes switches 9-1 and 9-2, induced voltage detectors 32-1, 32-2 are added, and a controller 10d is provided instead of the controller 10a illustrated in FIG. 4.

The switch 9-2 can connect and disconnect the second motor 42 to and from the inverter 4, as with the switch 9 of the first embodiment.

The switch 9-1 can connect and disconnect the first motor 41 to and from the inverter 4.

The induced voltage detector 32-1 detects induced voltages $E_{u1}$, $E_{v1}$, $E_{w1}$ of the first motor 41. The induced voltage detector 32-2 detects induced voltages $E_{u2}$, $E_{v2}$, $E_{w2}$ of the second motor 42.

Figure 16:
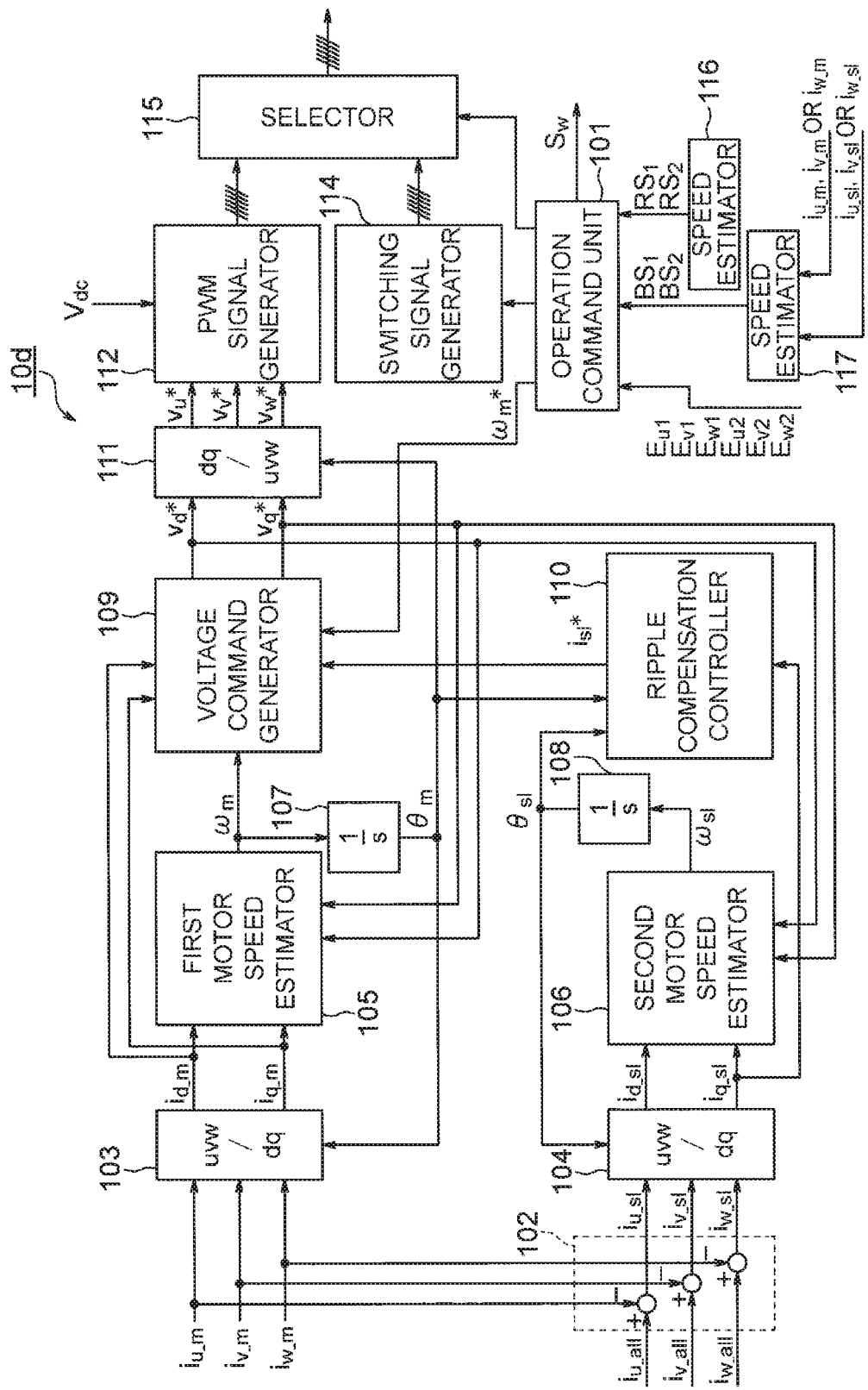
FIG. 16 is a functional block diagram illustrating an example of a configuration of a controller used in the fourth embodiment.

The controller 10d is configured as illustrated in FIG. 16, for example.

The controller 10d of FIG. 16 is generally the same as the controller 10a of FIG. 4.

However, the induced voltages $E_{u1}$, $E_{v1}$, $E_{w1}$, $E_{u2}$, $E_{v2}$, $E_{w2}$ detected by the induced voltage detectors 32-1, 32-2 are input to the operation command unit 101, and the operation command unit 101 also uses the induced voltages $E_{u1}$, $E_{v1}$, $E_{w1}$, $E_{u2}$, $E_{v2}$, $E_{w2}$ in the braking operation.

Specifically, the operation command unit 101 estimates currents upon braking of the motor 41 based on the induced voltages $E_{u1}$, $E_{v1}$, $E_{w1}$ and impedances of the motor 41, and estimates currents upon braking of the motor 42 based on the induced voltage $E_{u2}$, $E_{v2}$, $E_{w2}$ and impedances of the motor 42. The currents upon braking of each motor described here refer to currents flowing due to the induced voltages of the motor when the motor is connected to the inverter 4.

The operation command unit 101 further compares the estimated currents upon braking of the motor 41 and the estimated currents upon braking of the motor 42, and controls switching of the switches 9-1 and 9-2 in the braking based on a result of the comparison.

It is assumed that the impedances of each motor are known and data indicating the impedances is held in the controller 10d.

Processing can be made on the assumption that the motor 41 and the motor 42 are equal in impedance. Since the currents upon braking are used only for comparison of their magnitudes as described below, when it is assumed that they are equal in impedance, a result of a comparison in magnitude between the induced voltages can be directly used as a result of a comparison in magnitude between the currents upon braking.

The above example detects the induced voltages, but instead, it is possible to estimate the induced voltages of the motors by using estimated values of the rotational speeds of the motors. For this estimation, it is possible to use the relation that the induced voltages of a motor are proportional to the rotational speed of the motor.

When estimated values of the rotational speeds of the motors are used, a result of a comparison in magnitude between the estimated values of the rotational speeds can be directly used as a result of a comparison in magnitude between the currents upon braking.

In summary, it is sufficient that the magnitude relation between the currents upon braking of the motors can be estimated.

Figure 17:
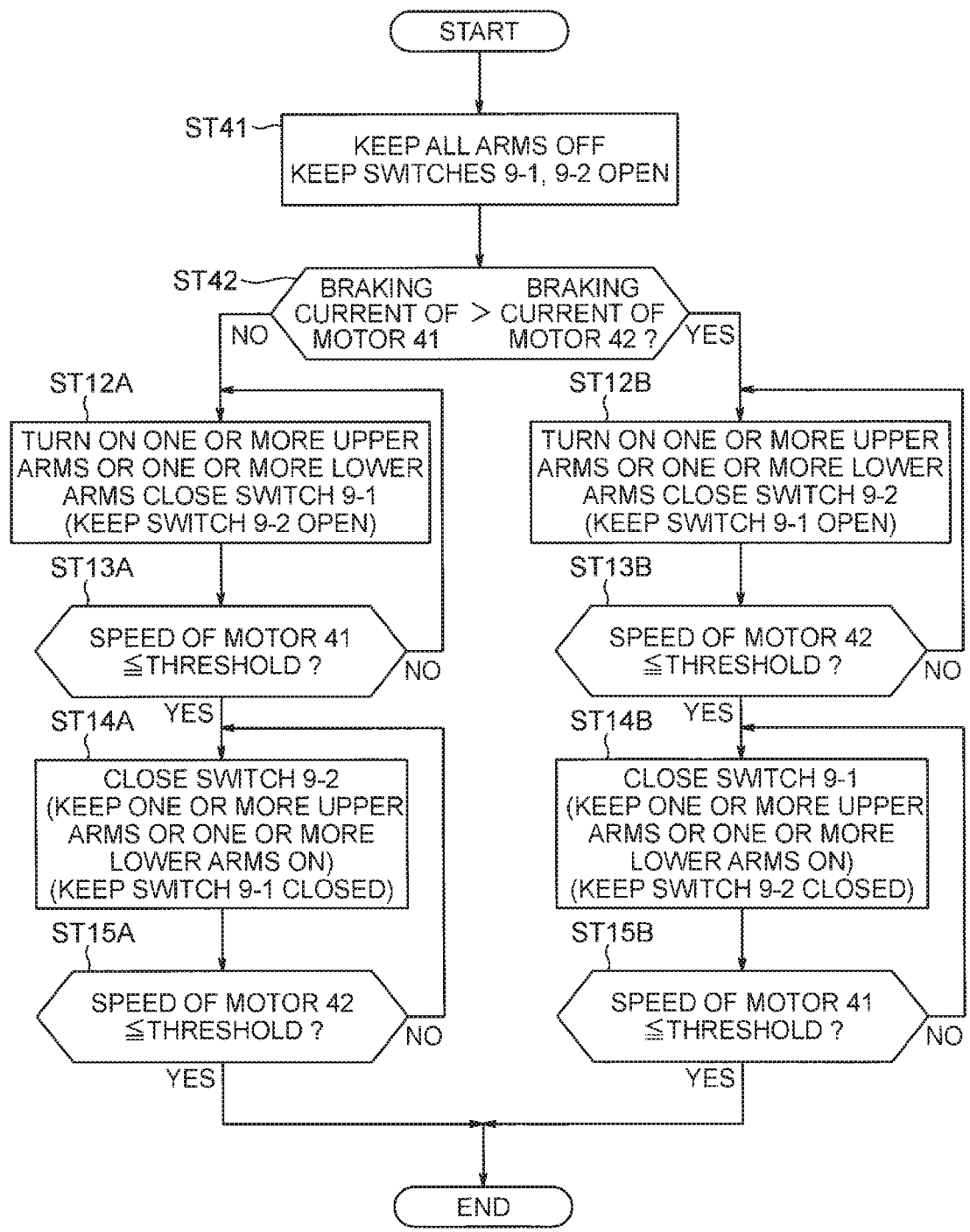
FIG. 17 is a flowchart illustrating a process in braking operation in the fourth embodiment.

A procedure of a process of the fourth embodiment will be described below with reference to FIG. 17.

In an initial state (step ST41) when the braking operation is started, all the arms of the inverter 4 are placed in the off states, and the switches 9-1 and 9-2 are placed in open states.

Thereby, no current path is formed between the motors 41, 42 and the inverter 4, and no current flows through the motors and the inverter 4 even when the motors are free running.

In step ST42, the currents upon braking of the motor 41 and the currents upon braking of the motor 42 are estimated and compared.

In this embodiment, the currents upon braking are estimated based on the induced voltages detected by the induced voltage detectors 32-1, 32-2, as described above.

When the comparison of the estimated values of the currents flowing upon braking shows that the estimated values of the currents upon braking of the motor 41 are larger (the estimated values of the currents upon braking of the motor 42 are smaller), the process proceeds to step ST12B. Otherwise, the process proceeds to step ST12A.

In step ST12A, one or more of the upper arms of the inverter 4, or one or more of the lower arms of the inverter 4 are kept on continuously, or PWM control is performed on them, and the switch 9-1 is closed. This can allow the currents due to the induced voltages of the motor 41 to flow through the inverter 4.

In step ST12B, one or more of the upper arms of the inverter 4, or one or more of the lower arms of the inverter 4 are kept on continuously, or PWM control is performed on them, and the switch 9-2 is closed. This can allow the currents due to the induced voltages of the motor 42 to flow through the inverter 4.

In summary, in steps ST12A, ST12B, one or more of the upper arms of the inverter 4, or one or more of the lower arms of the inverter 4 are kept on continuously, or PWM control is performed on them, and one of the switches 9-1 and 9-2 corresponding to the motor whose currents upon braking are estimated to be smaller.

Then, after completion of the braking operation on the motor whose currents upon braking are estimated to be smaller (ST13A, ST13B), one of the switches 9-1 and 9-2 that has been open is closed, and braking operation is performed on the motor on which braking operation has not yet been performed (ST14A, ST14B, ST15A, ST15B).

Specifically, in step ST13A, the operation command unit 101 compares the rotational speed $BS_1$ of the first motor 41 to a predetermined threshold.

When the rotational speed $BS_1$ of the first motor 41 is higher than the threshold (NO in step ST13A), the process returns to step ST12A, and the braking operation on the motor 41 is continued.

When the rotational speed $BS_1$ of the first motor 41 is not higher than the threshold (YES in step ST13A), the process proceeds to step ST14A.

In step ST14A, one or more of the upper arms of the inverter 4, or one or more of the lower arms of the inverter 4 are turned on, and the switch 9-2 is closed.

There may be a restriction that the arms turned on in step ST12A and the arms turned on in step ST14A must be on the same side of the inverter 4.

As a result of the closing of the switch 9-2, the currents due to the induced voltages of the motor 42 flow through the inverter 4 and the motor 41.

In step ST15A, the operation command unit 101 compares the rotational speed $BS_2$ of the second motor 42 to a predetermined threshold.

When the rotational speed $BS_2$ of the second motor 42 is higher than the threshold (NO in step ST15A), the process returns to step ST14A, and the braking operation is continued.

When the rotational speed $BS_2$ of the second motor 42 is not higher than the threshold (YES in step ST15A), the process ends.

In step ST13B, the operation command unit 101 compares the rotational speed $BS_2$ of the second motor 42 to a predetermined threshold.

When the rotational speed $BS_2$ of the second motor 42 is higher than the threshold (NO in step ST13B), the process returns to step ST12B, and the braking operation on the motor 42 is continued.

When the rotational speed $BS_2$ of the second motor 42 is not higher than the threshold (YES in step ST13B), the process proceeds to step ST14B.

In step ST14B, one or more of the upper arms of the inverter 4, or one or more of the lower arms of the inverter 4 are turned on, and the switch 9-1 is closed.

There may be a restriction that the arms turned on in step ST12B and the arms turned on in step ST14B must be on the same side of the inverter 4.

As a result of the closing of the switch 9-1, the currents due to the induced voltages of the motor 41 flow through the inverter 4 and the motor 42.

In step ST15B, the operation command unit 101 compares the rotational speed $BS_1$ of the first motor 41 to a predetermined threshold.

When the rotational speed $BS_1$ of the first motor 41 is higher than the threshold (NO in step ST15B), the process returns to step ST14B, and the braking operation is continued.

When the rotational speed $BS_1$ of the first motor 41 is not higher than the threshold (YES in step ST15B), the process ends.

As above, the braking operations are performed in order from the motor whose currents upon braking are estimated to be smaller, and the motor whose rotational speed has decreased due to the braking operation is used like an RL circuit, reducing the currents flowing through the motor on which the subsequent braking operation is performed. This can reduce current flowing through the inverter or the motors in the braking, and reduce the risks of failure of the inverter and the demagnetization due to overcurrent, temperature rise, or the like.

In the fourth embodiment, when performing the processing of step ST14A or ST14B, it is possible to perform feedback control of a ratio between the inverter currents and the motor currents, as described with reference to steps ST31 and ST32 in the third embodiment.

Various modifications can be made to the above first to fourth embodiments.

For example, in the above first to fourth embodiments, the phase currents of the second motor 42 are obtained by subtracting the phase currents of the first motor 41 from the phase currents of the inverter. However, it is also possible to provide a motor current detector similar to the motor current detector 6 for the second motor 42, as described above.

Further, in the above first to fourth embodiments, braking operation is performed on one of the two motors, and when the rotational speed of the one motor becomes not higher than a threshold, braking operation on the other motor is started. However, braking operation on the other motor may be started when a predetermined time elapses after the start of the braking operation on the one motor.

The above predetermined time is a time estimated to be required for the rotational speed of the one motor to become not higher than a threshold due to the braking operation on the one motor, or a time obtained by adding a margin thereto, and is determined in advance based on experience.

Also, in the above first to fourth embodiments, when the rotational speed of the other motor becomes not higher than a threshold, the braking operation ends. Alternatively, the braking operation may end when a predetermined time elapses after the start of the braking operation on the other motor.

The above predetermined time is a time estimated to be required for the rotational speed of the other motor to become not higher than a threshold due to the braking operation on the other motor, or a time obtained by adding a margin thereto, and is determined in advance based on experience.

In the above first to fourth embodiments, one of the output of the PWM signal generator 112 and the output of the switching signal generator 114 is selected by the selector 115. Alternatively, it is possible to provide a selector (not illustrated) that selects one of the output $v_u^*$, $v_v^*$, $v_w^*$ of the coordinate converter 111 and an output of a braking voltage command value generator (not illustrated), and supply the output of the selector to the PWM signal generator 112. The braking voltage command value generator used in this case generates, in accordance with a command from the operation command unit 101, a braking voltage command value for causing the PWM signal generator 112 to generate, for each of the switching elements of the arms of the inverter 4, a signal for performing PWM control on the switching element, a signal for keeping the switching element on continuously (a signal for maintaining the on state), or a signal for keeping the switching element off continuously (a signal for maintaining the off state).

Fifth Embodiment

Although the above describes a case in which the number of motors connectable to the inverter 4 is two, the number of the connectable motors may be three or more. When the number of the connectable motors is four, a motor driving apparatus may be configured as illustrated in FIG. 18, for example.

Figure 18:
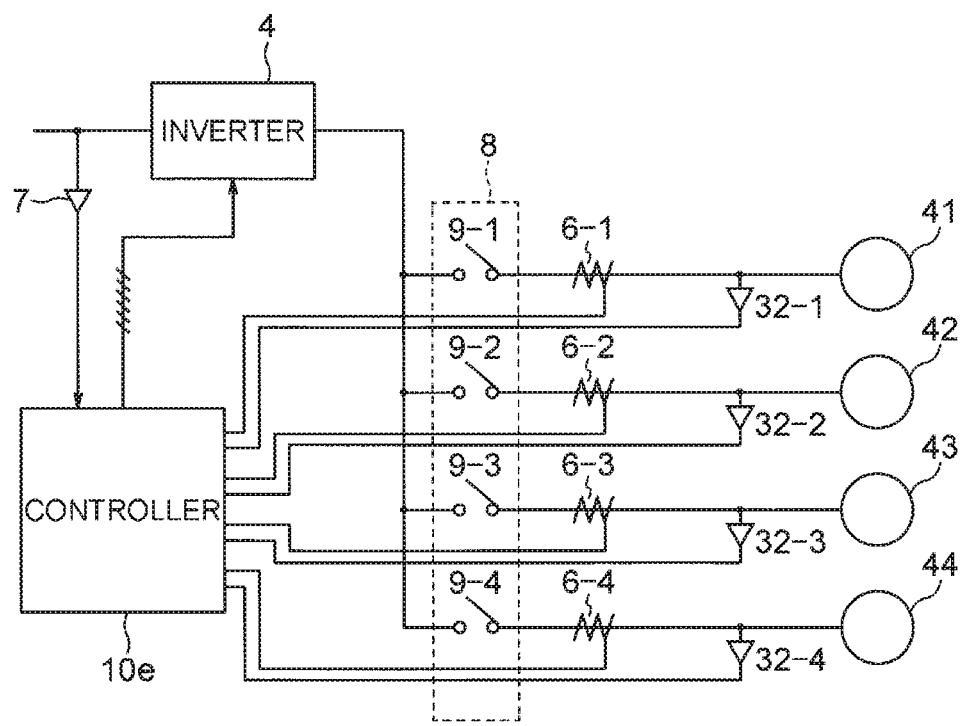
FIG. 18 is a diagram illustrating an example of a configuration of a motor driving apparatus of a fifth embodiment of the present invention.

The motor driving apparatus of FIG. 18 has a configuration obtained by modifying or extending the motor driving apparatus of FIG. 15.

FIG. 18 omits illustration of the part of the motor driving apparatus for supplying DC power to the inverter 4, specifically, the rectifier 2 and the smoothing device 3 of FIG. 15, and further omits illustration of the AC power supply 1.

In the configuration illustrated in FIG. 18, the output of the inverter 4 is connected to motors 41 to 44 via switches 9-1 to 9-4. Motor current detectors 6-1 to 6-4 and induced voltage detectors 32-1 to 32-4 are respectively provided between the switches 9-1 to 9-4 and the motors 41 to 44. Further, a controller 10e is provided instead of the controller 10d.

Currents detected by the motor current detectors 6-1 to 6-4 and voltages detected by the induced voltage detectors 32-1 to 32-4 are input to the controller 10e.

The motor current detectors 6-1 to 6-4 are each the same as the motor current detector 6 of FIG. 1 or 15.

The motor current detector 6-1 detects phase currents $i_{u\_m}$, $i_{v\_m}$, $I_{w\_m}$ of the first motor 41, as with the motor current detector 6 of FIG. 1 or 15. The motor current detector 6-2 detects phase currents $i_{u\_sl2}$, $i_{v\_sl2}$, $i_{w\_sl2}$ of the second motor 42. The motor current detector 6-3 detects phase currents $i_{u\_sl3}$, $i_{v\_sl3}$, $i_{w\_sl3}$ of the third motor 43. The motor current detector 6-4 detects phase currents $i_{u\_sl4}$, $i_{v\_sl4}$, $i_{w\_sl4}$ of the fourth motor 44.

The induced voltage detectors 32-1 to 32-4 are each the same as the induced voltage detector 32-1 or 32-2 of FIG. 15.

The induced voltage detector 32-1 detects induced voltages $E_{u1}$, $E_{v1}$, $E_{w1}$ of the first motor 41. The induced voltage detector 32-2 detects induced voltages $E_{u2}$, $E_{v2}$, $E_{w2}$ of the second motor 42. The induced voltage detector 32-3 detects induced voltages $E_{u3}$, $E_{v3}$, $E_{w3}$ of the third motor 43. The induced voltage detector 32-4 detects induced voltages $E_{u4}$, $E_{v4}$, $E_{w4}$ of the fourth motor 44.

The controller 10e is generally the same as the controller 10d of FIG. 16, but differs as described below. The controller 10e is configured as illustrated in FIG. 19, for example.

Figure 19:
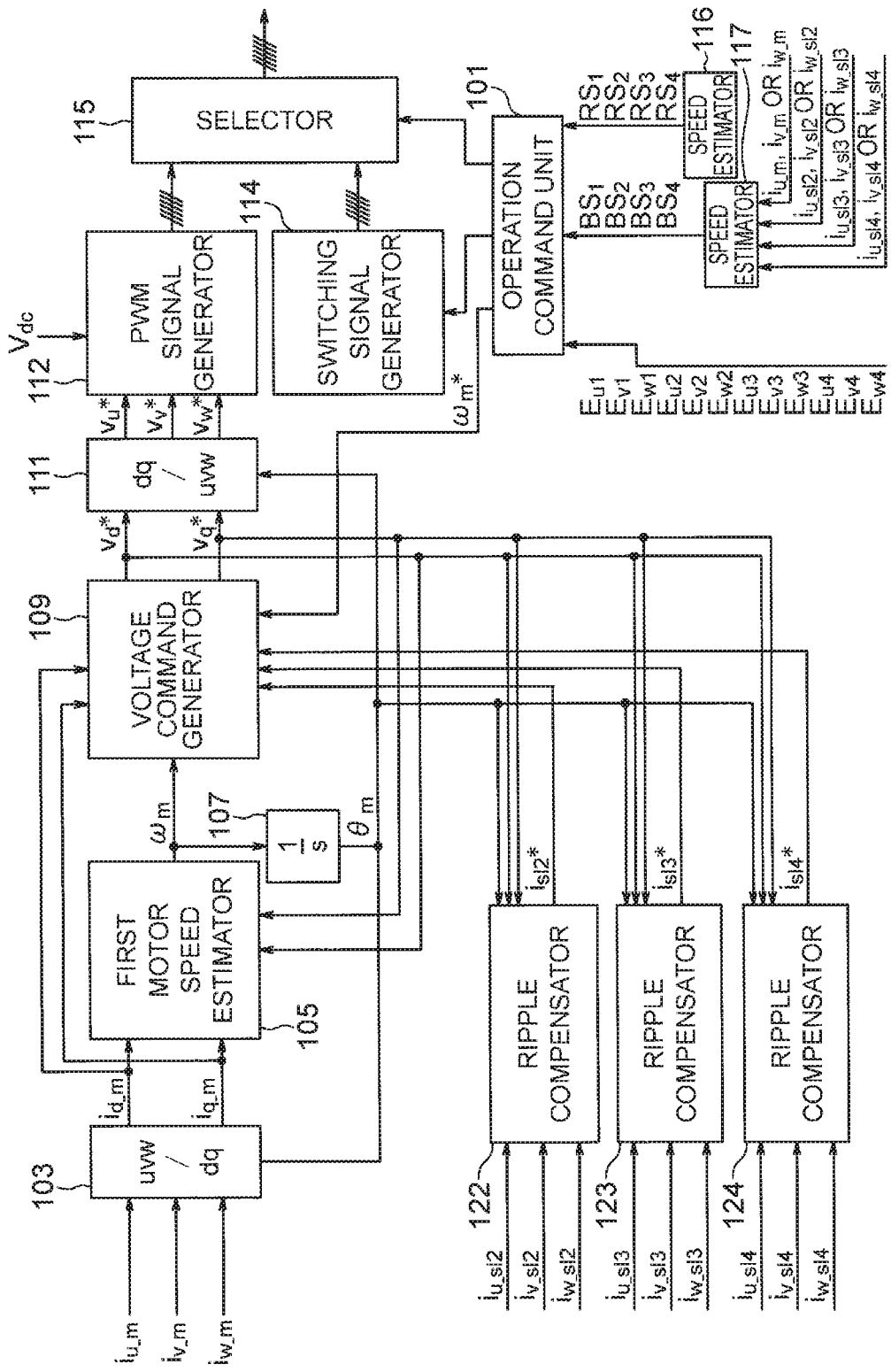
FIG. 19 is a functional block diagram illustrating an example of a configuration of a controller of FIG. 18.

In FIG. 19, the ripple compensators 122, 123, 124 are respectively provided for the second, third, and fourth motors 42, 43, 44, and each include components similar to the coordinate converter 104, the motor speed estimator 106, the integrator 108, and the ripple compensation controller 110 of FIG. 2 or 4, and each generate a ripple compensation current command value for the corresponding motor, based on the dq-axis voltage command values $v_d^*$, $v_g^*$ and the phase currents of the corresponding motor.

For example, the ripple compensator 122 generates a ripple compensation current command value $i_{sl2}^*$ for the second motor 42, based on the phase currents $i_{u\_sl2}$, $i_{v\_sl2}$, $i_{w\_sl2}$ of the second motor 42.

Similarly, the ripple compensator 123 generates a ripple compensation current command value $i_{sl3}^*$ for the third motor 43, based on the phase currents $i_{u\_sl3}$, $i_{v\_sl3}$, $i_{w\_sl3}$ of the third motor 43.

Similarly, the ripple compensator 124 generates a ripple compensation current command value $i_{sl4}^*$ for the fourth motor 44, based on the phase currents $i_{u\_sl4}$, $i_{v\_sl4}$, $i_{w\_sl4}$ of the fourth motor 44.

The voltage command generator 109 calculates the dq-axis voltage command values $v_d^*$, $v_q^*$, based on the dq-axis currents $i_{d\_m}$, $i_{q\_m}$, the rotational frequency estimated value $\omega_m$, and the ripple compensation current command values $i_{sl2}^*$, $i_{sl3}^*$, $i_{sl4}^*$.

Since the ripple compensation current command values $i_{sl2}^*$, $i_{sl3}^*$, $i_{sl4}^*$ generated by the ripple compensators 122, 123, 124 are used in generation of the dq-axis voltage command values $v_d^*$, $v_g^*$ in the voltage command generator 109, control is performed so that rotational phases of the four motors 41 to 44 coincide with each other.

The speed estimator 116 estimates rotational speeds $RS_1$, $RS_2$, $RS_3$, $RS_4$ of the motors in a state in which the motors 41, 42, 43, 44 are not being driven by the inverter 4.

The speed estimator 117 estimates rotational speeds $BS_1$, $BS_2$, $BS_3$, $BS_4$ of the motors 41, 42, 43, 44 when braking operation is being performed on the motors.

In the illustrated example, the speed estimator 117 estimates, for each motor, the rotational speed of the motor based on at least one of the phase currents of the motor.

For example, the speed estimator 117 estimates the rotational speed $BS_1$ of the first motor 41 based on at least one of the phase currents $i_{u\_m}$, $i_{v\_m}$, $i_{w\_m}$ of the first motor 41 detected by the motor current detector 6-1.

Similarly, the speed estimator 117 estimates the rotational speed $BS_2$ of the second motor 42 based on at least one of the phase currents $i_{u\_sl2}$, $i_{v\_sl2}$, $i_{w\_sl2}$ of the second motor 42.

Similarly, the speed estimator 117 estimates the rotational speed $BS_3$ of the third motor 43 based on at least one of the phase currents $i_{u\_sl3}$, $i_{v\_sl3}$, $i_{w\_sl3}$ of the third motor 43.

Similarly, the speed estimator 117 estimates the rotational speed $BS_4$ of the fourth motor 44 based on at least one of the phase currents $i_{u\_sl4}$, $i_{v\_sl4}$, $i_{w\_sl4}$ of the fourth motor 44.

The operation command unit 101 controls the braking operation based on the speeds $RS_1$, $RS_2$, $RS_3$, $RS_4$ of the motors 41 to 44 estimated by the speed estimator 116, the induced voltages $E_{u1}$, $E_{v1}$, $E_{w1}$, $E_{u2}$, $E_{v2}$, $E_{w2}$, $E_{u3}$, $E_{v3}$, $E_{w3}$, $E_{u4}$, $E_{v4}$, $E_{w4}$ detected by the induced voltage detectors 32-1 to 32-4, the rotational speeds $BS_1$, $BS_2$, $BS_3$, $BS_4$ of the motors 41 to 44 estimated by the speed estimator 117. The control of the braking operation includes control of the switching signal generator 114, control of the selector 115, and control of the connection switching device 8. The control of the connection switching device 8 includes control of the switches 9-1 to 9-4.

For example, when starting braking operation on the four motors 41 to 44, the operation command unit 101 first determines an order in the braking operation based on the induced voltages $E_{u1}$, $E_{v1}$, $E_{w1}$, $E_{u2}$, $E_{v2}$, $E_{w2}$, $E_{u3}$, $E_{v3}$, $E_{w3}$, $E_{u4}$, $E_{v4}$, $E_{w4}$. The order here is the order in which the motors are selected in the braking operation. For example, the motors are selected in ascending order of induced voltage.

In braking operation on the first selected motor, the switch corresponding to the motor is closed, the other switches are opened, and one or more of the upper arms of the inverter 4, or one or more of the lower arms of the inverter 4 are turned on, allowing current due to the induced voltages of the selected motor to flow through the inverter 4.

When the rotational speed of the motor becomes not higher than a threshold, or when a predetermined time elapses after the start of the braking operation on the motor, braking operation on the second selected motor is started.

In the braking operation on the second selected motor, the switch corresponding to the motor is closed, and current due to the induced voltages of the motor is allowed to flow through at least one of the inverter 4 and the first selected motor. To allow it to flow through the inverter 4, one or more of the upper arms of the inverter 4, or one or more of the lower arms of the inverter 4 are turned on. To allow it to flow through the first selected motor, the switch corresponding to the first selected motor is closed.

When the rotational speed of the motor becomes not higher than a threshold, or when a predetermined time elapses after the start of the braking operation on the motor, braking operation on the third selected motor is started.

In the braking operation on the third selected motor, the switch corresponding to the motor is closed, and current due to the induced voltages of the motor is allowed to flow through at least one of the inverter 4, the first selected motor, and the second selected motor. To allow it to flow through the inverter 4, one or more of the upper arms of the inverter 4, or one or more of the lower arms of the inverter 4 are turned on. To allow it to flow through the first selected motor, the switch corresponding to the first selected motor is closed. To allow it to flow through the second selected motor, the switch corresponding to the second selected motor is closed.

When the rotational speed of the motor becomes not higher than a threshold, or when a predetermined time elapses after the start of the braking operation on the motor, braking operation on the fourth selected motor is started.

In the braking operation on the fourth (last) selected motor, the switch corresponding to the motor is closed, and current due to the induced voltages of the motor is allowed to flow through at least one of the inverter 4, the first selected motor, the second selected motor, and the third selected motor. To allow it to flow through the inverter 4, one or more of the upper arms of the inverter 4, or one or more of the lower arms of the inverter 4 are turned on. To allow it to flow through the first selected motor, the switch corresponding to the first selected motor is closed. To allow it to flow through the second selected motor, the switch corresponding to the second selected motor is closed. To allow it to flow through the third selected motor, the switch corresponding to the third selected motor is closed.

When the rotational speed of the motor becomes not higher than a threshold, or when a predetermined time elapses after the start of the braking operation on the motor, the braking operation is ended.

Thus, the series of braking operations end.

As above, in the braking operation on each of the second to last motors, current due to the induced voltages of the motor is allowed to flow through at least one of the inverter 4 and the one or more motors that have been subjected to braking operation earlier than the motor.

When the current is allowed to flow through both the inverter 4 and the one or motors that have been subjected to braking operation earlier than the motor, it is possible to change a ratio between currents flowing therethrough by controlling the duty cycles of PWM control on the inverter 4.

In determining the ratio between the currents, feedback control may be performed based on the currents flowing through the inverter 4 and the currents flowing through the one or more motors, in the same manner as described in the third embodiment.

In the above example, the motor current detector is provided for each of the four motors. However, it is possible to provide motor current detectors for three of the motors and determine the phase currents of the remaining one of the motors by subtracting the phase currents of the three motors from the phase currents of the inverter 4.

Also, although the above example is a modification to the fourth embodiment, the same modification can be made to the first to third embodiments. In this case, it is possible to provide switches for three of the motors and provide no switch for the remaining one of the motors.

Also, modifications described in the first to fourth embodiments can be made to the fifth embodiment.

For example, instead of providing the switching signal generator 114 and the selector 115 as illustrated in FIG. 19, it is possible to supply the PWM signal generator 112 with the output of a selector (not illustrated) that selects one of the output of the coordinate converter 111 and an output of a braking voltage command value generator (not illustrated).

Although the above describes a case in which the number of motors connectable to the inverter 4 is four, the same applies to cases in which the number of motors connectable to the inverter 4 is other than four.

In generalization, the motor driving apparatus may include an inverter connectable to n motors (n being an integer not less than 2) each including a rotor having a permanent magnet, and be configured to perform braking operation on i (i being an integer from 1 to n−1) of the n motors and then perform braking operation on j (j being an integer from 1 to n−i) of the n motors other than the i motors.

In this case, it is possible that, when the rotational speeds of the i motors become not higher than a predetermined threshold, the braking operation on the j motors is started.

Alternatively, it is possible that, when a predetermined time elapses after the start of the braking operation on the i motors, the braking operation on the j motors is started.

It is also possible to, when performing the braking operation on the i motors, keep one or more switching elements of one or more upper arms or one or more lower arms of the inverter on continuously or perform PWM control on the switching elements, thereby allowing current due to induced voltage of the i motors to flow through the inverter.

It is also possible to, when performing the braking operation on the i motors, to keep the motors other than the i motors disconnected from the inverter and the i motors.

In addition, it is possible, when performing the braking operation on the j motors, to connect the j motors to the inverter, and keep one or more switching elements of one or more upper arms or one or more lower arms of the inverter on continuously or perform PWM control on the switching elements, thereby allowing current due to induced voltage of the j motors to flow through the inverter.

Alternatively, it is also possible, when performing the braking operation on the j motors, to connect the j motors to the i motors, thereby allowing current due to induced voltage of the j motors to flow through the i motors.

In this case, it is possible to keep the switching elements of all the arms of the inverter off continuously, thereby preventing current due to induced voltage of the j motors from flowing through the inverter.

Alternatively, it is possible to keep one or more switching elements of one or more upper arms or one or more lower arms of the inverter on continuously or perform PWM control on the switching elements, thereby allowing current due to induced voltage of the j motors to flow also through the inverter.

It is also possible to perform braking operation on the n motors one by one in order.

In this case, it is possible to estimate, for each of the n motors, a current occurring in the braking operation, and perform braking operation on the n motors in ascending order of the estimated currents.

In this case, for each of the n motors, the current occurring in the braking operation may be a current flowing due to induced voltage of the motor when the motor is connected to the inverter.

When braking operation is performed on the n motors one by one in order, it is preferable that for each of at least n−1 of the n motors, a switch for connection to the inverter be provided.

Sixth Embodiment

Figure 20:
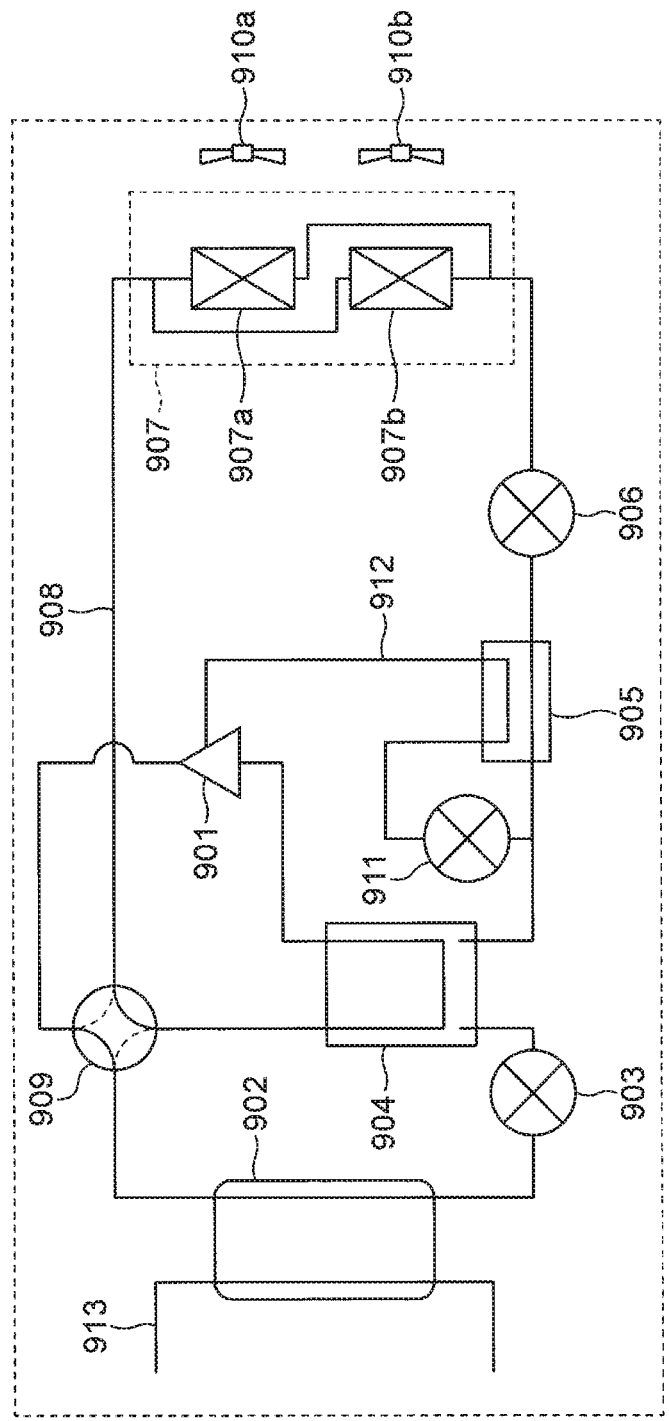
FIG. 20 is a circuit configuration diagram illustrating a heat pump apparatus of a sixth embodiment of the present invention.

In a sixth embodiment, an example of a circuit configuration of a heat pump apparatus will be described. FIG. 20 is a circuit configuration diagram of a heat pump apparatus 900 according to the sixth embodiment.

FIG. 21 is a Mollier chart concerning the state of a refrigerant in the heat pump apparatus 900 illustrated in FIG. 20. In FIG. 21, the horizontal axis represents the specific enthalpy, while the vertical axis represents the refrigerant pressure.

The heat pump apparatus 900 includes a main refrigerant circuit 908 in which a compressor 901, a heat exchanger 902, an expansion mechanism 903, a receiver 904, an internal heat exchanger 905, an expansion mechanism 906, and a heat exchanger 907 are sequentially connected by piping, and in which the refrigerant circulates. In the main refrigerant circuit 908, a four-way valve 909 is provided on the discharge side of the compressor 901 to allow the direction of the circulation of the refrigerant to be changed.

The heat exchanger 907 has a first part 907a and a second part 907b, to which valves (not illustrated) are connected to control the flow of the refrigerant according to the load of the heat pump apparatus 900. For example, when the load of the heat pump apparatus 900 is relatively high, the refrigerant is allowed to flow through both of the first part 907a and the second part 907b. When the load of the heat pump apparatus 900 is relatively low, the refrigerant is allowed to flow through only one of the first part 907a and the second part 907b, e.g., only the first part 907a.

Fans 910a and 910b are disposed near the first part 907a and the second part 907b, respectively corresponding to the first part 907a and the second part 907b. The fans 910a and 910b are driven by respective separate motors. For example, the motors 41 and 42 described in one of the first to fourth embodiments are used to drive the fans 910a and 910b, respectively.

The heat pump apparatus 900 further includes an injection circuit 912 connecting, by means of piping, from between the receiver 904 and the internal heat exchanger 905 to an injection pipe of the compressor 901. An expansion mechanism 911 and the internal heat exchanger 905 are sequentially connected in the injection circuit 912.

A water circuit 913, in which water circulates, is connected to the heat exchanger 902. A device using water, such as a hot water dispenser, a radiator, a heat radiator for floor heating or the like is connected to the water circuit 913.

First, the operation of the heat pump apparatus 900 in heating operation will be described. In the heating operation, the four-way valve 909 is set in the direction of the solid lines. Here, the heating operation includes not only heating used in air conditioning, but also water heating for hot water supply.

A gas-phase refrigerant made to have a high temperature and a high pressure at the compressor 901 (point 1 in FIG. 21) is discharged from the compressor 901, and is liquefied by heat exchange at the heat exchanger 902 serving as a condenser and a heat radiator (point 2 in FIG. 21). At this time, water circulating in the water circuit 913 is heated by heat from the refrigerant, and used for air heating, hot water supply, or the like.

The liquid-phase refrigerant liquefied at the heat exchanger 902 is decompressed at the expansion mechanism 903 into a gas-liquid two-phase state (point 3 in FIG. 21). The refrigerant turned into the gas-liquid two-phase state at the expansion mechanism 903 is cooled and liquefied by heat exchange at the receiver 904 with the refrigerant to be drawn into the compressor 901 (point 4 in FIG. 21). The liquid-phase refrigerant liquefied at the receiver 904 branches and flows into the main refrigerant circuit 908 and the injection circuit 912.

The liquid-phase refrigerant flowing in the main refrigerant circuit 908 is further cooled by heat exchange at the internal heat exchanger 905 with the refrigerant flowing in the injection circuit 912 after being decompressed at the expansion mechanism 911 into a gas-liquid two-phase state (point 5 in FIG. 21). The liquid-phase refrigerant cooled at the internal heat exchanger 905 is decompressed at the expansion mechanism 906 into a gas-liquid two-phase state (point 6 in FIG. 21). The refrigerant turned into the gas-liquid two-phase state at the expansion mechanism 906 is heated by heat exchange with the outdoor air at the heat exchanger 907 serving as an evaporator (point 7 in FIG. 21).

The refrigerant heated at the heat exchanger 907 is further heated at the receiver 904 (point 8 in FIG. 21), and is drawn into the compressor 901.

Meanwhile, the refrigerant flowing in the injection circuit 912 is decompressed at the expansion mechanism 911 (point 9 in FIG. 21), and subjected to heat exchange at the internal heat exchanger 905 (point 10 in FIG. 21), as described above. The refrigerant (injection refrigerant) in the gas-liquid two-phase state subjected to heat exchange at the internal heat exchanger 905 flows through the injection pipe of the compressor 901 into the compressor 901, while keeping the gas-liquid two-phase state.

In the compressor 901, the refrigerant drawn from the main refrigerant circuit 908 (point 8 in FIG. 21) is compressed to an intermediate pressure and heated (point 11 in FIG. 21).

The refrigerant compressed to the intermediate pressure and heated (point 11 in FIG. 21) is mixed with the injection refrigerant (point 10 in FIG. 21) and decreases in temperature (point 12 in FIG. 21).

The refrigerant with its temperature lowered (point 12 in FIG. 21) is further compressed and heated to a high temperature and a high pressure, and is discharged (point 1 in FIG. 21).

When the injection operation is not performed, the opening degree of the expansion mechanism 911 is set to a fully closed state. Specifically, when the injection operation is performed, the opening degree of the expansion mechanism 911 is larger than a certain value. When the injection operation is not performed, the opening degree of the expansion mechanism 911 is smaller than the above certain value. Thereby, no refrigerant flows into the injection pipe of the compressor 901.

The opening degree of the expansion mechanism 911 is electronically controlled by a controller formed by a microcomputer or the like.

Next, the operation of the heat pump apparatus 900 in cooling operation will be described. In the cooling operation, the four-way valve 909 is set in the direction of the dashed lines. Here, the cooling operation includes not only cooling used in air conditioning, but also cooling of water, freezing of foods, and the like.

A gas-phase refrigerant made to have a high temperature and a high pressure at the compressor 901 (point 1 in FIG. 21) is discharged from the compressor 901, and is liquefied by heat exchange at the heat exchanger 907 serving as a condenser and a heat radiator (point 2 in FIG. 21). The liquid-phase refrigerant liquefied at the heat exchanger 907 is decompressed at the expansion mechanism 906 into a gas-liquid two-phase state (point 3 in FIG. 21). The refrigerant turned into the gas-liquid two-phase state at the expansion mechanism 906 is cooled and liquefied by heat exchange at the internal heat exchanger 905 (point 4 in FIG. 21). At the internal heat exchanger 905, heat is exchanged between the refrigerant turned into the gas-liquid two-phase state at the expansion mechanism 906 and the refrigerant in a gas-liquid two-phase state obtained by decompression at the expansion mechanism 911 of the liquid-phase refrigerant liquefied at the internal heat exchanger 905 (point 9 in FIG. 21). The liquid-phase refrigerant subjected to heat exchange at the internal heat exchanger 905 (point 4 in FIG. 21) branches and flows into the main refrigerant circuit 908 and the injection circuit 912.

The liquid-phase refrigerant flowing in the main refrigerant circuit 908 is further cooled by heat exchange at the receiver 904 with the refrigerant to be drawn into the compressor 901 (point 5 in FIG. 21). The liquid-phase refrigerant cooled at the receiver 904 is decompressed at the expansion mechanism 903 into a gas-liquid two-phase state (point 6 in FIG. 21). The refrigerant turned into the gas-liquid two-phase state at the expansion mechanism 903 is heated by heat exchange at the heat exchanger 902 serving as an evaporator (point 7 in FIG. 21). At this time, water circulating in the water circuit 913 is cooled by heat absorption by the refrigerant, and used for air cooling, cooling, freezing, or the like.

The refrigerant heated at the heat exchanger 902 is further heated at the receiver 904 (point 8 in FIG. 21), and is drawn into the compressor 901.

Meanwhile, the refrigerant flowing in the injection circuit 912 is decompressed at the expansion mechanism 911 (point 9 in FIG. 21), and subjected to heat exchange at the internal heat exchanger 905 (point 10 in FIG. 21), as described above. The refrigerant (injection refrigerant) in the gas-liquid two-phase state subjected to the heat exchange at the internal heat exchanger 905 flows in through the injection pipe of the compressor 901, while keeping the gas-liquid two-phase state.

The compression operation in the compressor 901 is the same as in the heating operation.

When the injection operation is not performed, the opening degree of the expansion mechanism 911 is set to a fully closed state to prevent the refrigerant from flowing into the injection pipe of the compressor 901, as in the case of the heating operation.

In the above example, the heat exchanger 902 is described to be a heat exchanger, such as a plate-type heat exchanger, that allows heat exchange between the refrigerant and water circulating in the water circuit 913. The heat exchanger 902 is not limited to this, but may be one that allows heat exchange between the refrigerant and air.

Also, the water circuit 913 is not limited to a circuit in which water circulates, but may be one in which another fluid circulates.

In the above example, the heat exchanger 907 has the first part 907*a* and the second part 907*b*. As an alternative, or in addition, the heat exchanger 902 may have two parts. When the heat exchanger 902 allows heat exchange between the refrigerant and air, it is possible that the two parts have respective fans, and the fans are driven by separate motors.

The above describes a configuration in which the heat exchanger 902 or 907 has two parts. As an alternative, or in addition, the compressor 901 may have a first part (first compression mechanism) and a second part (second compression mechanism). In such a case, control is made so that, when the load of the heat pump apparatus 900 is relatively high, both of the first part and the second part perform the compression operation, and when the load of the heat pump apparatus 900 is relatively low, only one of the first part and the second part, e.g., only the first part, performs the compression operation.

In the case of such a configuration, the first part and the second part of the compressor 901 are provided with separate motors for driving them. For example, the motors 41 and 42 described in one of the first to fourth embodiments are respectively used for driving the first part and the second part.

Although the above describes cases in which at least one of the heat exchangers 902 and 907 has two parts and is provided with two fans, a configuration in which a heat exchanger has three or more parts is also conceivable. In generalization, a configuration is conceivable in which at least one of the heat exchangers 902 and 907 has multiple parts, fans are provided for the respective parts, and motors are provided for the respective fans. In such a case, the multiple motors can be driven by a single inverter by using the motor driving apparatus described in one of the first to fifth embodiments.

Also, although the above describes a case in which the compressor 901 has two parts, a configuration in which the compressor 901 has three or more parts is conceivable. In generalization, a configuration is conceivable in which the compressor 901 has multiple parts, and motors are provided for the respective parts. In such a case, the multiple motors can be driven by a single inverter by using the motor driving apparatus described in one of the first to fifth embodiments.

Refrigeration cycle equipment can be configured by combining the heat pump apparatus described in the sixth embodiment and the motor driving apparatus described in one of the first to fifth embodiments.

As described above, when there are multiple motors for driving the compressor 901 or the fans of the heat exchanger 902 or 907 of the sixth embodiment, application of the configuration described in one of the first to fifth embodiments makes it possible to drive the multiple motors by means of a single inverter 4, allowing the motor driving apparatus to be reduced in cost, size, and weight.

Also, when the motors are used for driving fans of a heat exchanger, the reduction in size of the motor driving apparatus allows increase in size of the heat exchanger. This improves the efficiency of heat exchange, allowing improvement in efficiency.

Further, since it is possible to reduce current flowing through the inverter or the motors in the braking operation, it is possible to reduce the risks of failure of the inverter and demagnetization of the motors.

Also, since the number of the motors driven by the inverter 4 can be controlled by operating the switches (9, 9-1 to 9-4), it is possible to cause only a subset of the multiple motors, e.g., the first motor 41, to operate when the load is relatively low, and cause a greater number of the motors, e.g., both the first motor 41 and the second motor 42, to operate when the load is relatively high, for example. By changing the number of the driven motors according to the load in such a manner, it is possible to keep the number of the driven motors to the minimum necessary, and further improve the efficiency of the heat pump apparatus.

Further, for example, in a case where the motors are used for driving fans, it is possible, when the fans are free running due to external wind or the like, while performing braking operation on only a subset of the motors, e.g., the first motor 41, and starting the subset of the motors, to leave the remaining motor(s), e.g., the second motor 42, free running and allow the motor(s) to contribute heat exchange at the heat exchanger 902 or 907, thereby further improving the efficiency.

The configurations described in the above embodiments are examples of configurations of the present invention, and can be combined with other known techniques, and may be modified, e.g., by partial omission, without departing from the gist of the present invention.

INDUSTRIAL APPLICABILITY

As above, the present invention is suitable for a motor driving apparatus and refrigeration cycle equipment provided therewith, and can be used in any applications in which braking operation needs to be performed on multiple motors.

The invention claimed is:

1. A motor driving apparatus comprising:
an inverter connectable to n motors each including a rotor having a permanent magnet, n being an integer not less than 2,
wherein the motor driving apparatus performs braking operation on i of the n motors and then performs braking operation on j of the n motors other than the i motors, i being an integer from 1 to n−1, j being an integer from 1 to n−i,
wherein when performing the braking operation on the i motors, the motor driving apparatus keeps one or more switching elements of one or more upper arms or one or more lower arms of the inverter on continuously or performs PWM control on the switching elements, thereby allowing current due to induced voltage of the i motors to flow through the inverter, and
wherein when performing the braking operation on the i motors, the motor driving apparatus keeps the motors other than the i motors disconnected from the inverter and the i motors.

2. The motor driving apparatus of claim 1, wherein when rotational speeds of the i motors become not higher than a predetermined threshold, the motor driving apparatus starts the braking operation on the j motors.

3. The motor driving apparatus of claim 1, wherein when a predetermined time elapses after a start of the braking operation on the i motors, the motor driving apparatus starts the braking operation on the j motors.

4. The motor driving apparatus of claim 1, wherein when performing the braking operation on the j motors, the motor driving apparatus connects the j motors to the inverter, and keeps one or more switching elements of one or more upper arms or one or more lower arms of the inverter on continuously or performs PWM control on the switching elements, thereby allowing current due to induced voltage of the j motors to flow through the inverter.

5. The motor driving apparatus of claim 1, wherein when performing the braking operation on the j motors, the motor driving apparatus connects the j motors to the i motors, thereby allowing current due to induced voltage of the j motors to flow through the i motors.

6. The motor driving apparatus of claim 5, wherein when performing the braking operation on the j motors, the motor driving apparatus keeps switching elements of all arms of the inverter off continuously, thereby preventing current due to induced voltage of the j motors from flowing through the inverter.

7. The motor driving apparatus of claim 5, wherein when performing the braking operation on the j motors, the motor driving apparatus keeps one or more switching elements of one or more upper arms or one or more lower arms of the inverter on continuously or performs PWM control on the switching elements, thereby allowing the current due to the induced voltage of the j motors to flow also through the inverter.

8. The motor driving apparatus of claim 1, wherein the motor driving apparatus performs braking operation on the n motors one by one in order.

9. The motor driving apparatus of claim 1, wherein for each of at least n−1 of the n motors, a switch for connection to the inverter is provided.

10. The motor driving apparatus of claim 1, wherein the braking operation is performed on a motor in a free running state.

11. Refrigeration cycle equipment comprising the motor driving apparatus of claim 1.

12. A motor driving apparatus comprising:
an inverter connectable to n motors each including a rotor having a permanent magnet, n being an integer not less than 2,
wherein the motor driving apparatus performs braking operation on i of the n motors and then performs braking operation on j of the n motors other than the i motors, i being an integer from 1 to n−1, j being an integer from 1 to n−i,
wherein the motor driving apparatus performs braking operation on the n motors one by one in order, and
wherein the motor driving apparatus estimates, for each of the n motors, a current occurring in the braking operation, and performs braking operation on the n motors in ascending order of the estimated currents.

13. The motor driving apparatus of claim 12, wherein for each of the n motors, the current occurring in the braking operation is a current flowing due to induced voltage of the motor when the motor is connected to the inverter.

14. The motor driving apparatus of claim 12, wherein for each of at least n−1 of the n motors, a switch for connection to the inverter is provided.

15. The motor driving apparatus of claim 12, wherein the braking operation is performed on a motor in a free running state.

16. Refrigeration cycle equipment comprising the motor driving apparatus of claim 12.

* * * * *